US012529828B2

(12) United States Patent
Ruhnau et al.

(10) Patent No.: US 12,529,828 B2
(45) Date of Patent: Jan. 20, 2026

(54) ILLUMINATION LINE GENERATION BY DOUBLE-DUTY DIFFUSION

(71) Applicant: Cognex Corporation, Natick, MA (US)

(72) Inventors: Thomas Ruhnau, Herbolzheim (DE); Khaled Aljasem, Bad Krozingen (DE); Esther Oteo Lozano, Vaal (NL); John F. Filhaber, Norwich, CT (US)

(73) Assignee: Cognex Corporation, Natick, MA (US)

( * ) Notice: Subject to any disclaimer, the term of this patent is extended or adjusted under 35 U.S.C. 154(b) by 127 days.

(21) Appl. No.: 18/497,851

(22) Filed: Oct. 30, 2023

(65) Prior Publication Data
US 2024/0184022 A1 Jun. 6, 2024

Related U.S. Application Data

(60) Provisional application No. 63/421,105, filed on Oct. 31, 2022.

(51) Int. Cl.
*G02B 5/02* (2006.01)
*G01N 15/075* (2024.01)
(Continued)

(52) U.S. Cl.
CPC .......... *G02B 5/0215* (2013.01); *G01N 15/075* (2024.01); *G01N 21/31* (2013.01);
(Continued)

(58) Field of Classification Search
CPC .......... G02B 5/0215; G02B 17/0668; G02B 5/0221; G02B 5/0257; G02B 5/0284;
(Continued)

(56) References Cited

U.S. PATENT DOCUMENTS

| 10,620,447 B2 | 4/2020 | Filhaber |
| 11,036,057 B2 | 6/2021 | Filhaber |
| (Continued) | | |

FOREIGN PATENT DOCUMENTS

EP 2365906 12/2016

OTHER PUBLICATIONS

International Search Report and Written Opinion in International Appln. No. PCT/US2023/036258, mailed on Apr. 2, 2024, 13 pages.

*Primary Examiner* — Thanh Luu
*Assistant Examiner* — Mai Thi Ngoc Tran
(74) *Attorney, Agent, or Firm* — Fish & Richardson P.C.

(57) ABSTRACT

An optical system includes a light source operable to produce input light, a linear diffuser, and a reflector. The light source, linear diffuser, and reflector are arranged and configured to direct the input light from the light source to the linear diffuser, project diffused light from the linear diffuser to the reflector, reflect the diffused light from the reflector to the linear diffuser as reflected light, and modify the reflected light at the linear diffuser to output a planar fan of diffused light, so that an illumination line forms at an intersection of the planar fan and an object. A system includes an optical sub-system configured to generate a planar fan of diffused light by passing input light through a single linear diffuser twice, and a control sub-system configured to operate the optical sub-system to control use of the planar fan of diffused light.

25 Claims, 12 Drawing Sheets

(51) Int. Cl.
*G01N 21/31* (2006.01)
*G01N 21/64* (2006.01)
*G01N 21/95* (2006.01)
*G01N 33/00* (2006.01)
*G02B 17/06* (2006.01)

(52) U.S. Cl.
CPC ......... *G01N 21/6489* (2013.01); *G01N 21/95* (2013.01); *G01N 33/0027* (2013.01); *G02B 17/0668* (2013.01)

(58) Field of Classification Search
CPC .............. G02B 5/0289; G02B 27/0977; G02B 27/0983; G02B 5/0278; G01N 15/075; G01N 21/31; G01N 21/6489; G01N 21/95; G01N 33/0027
USPC .......................................................... 356/326
See application file for complete search history.

(56) References Cited

U.S. PATENT DOCUMENTS

| | | | |
|---|---|---|---|
| 2014/0071658 A1* | 3/2014 | Weber | G02F 1/133611 |
| | | | 362/97.1 |
| 2015/0062903 A1* | 3/2015 | Hu | G03B 21/2033 |
| | | | 362/259 |
| 2017/0227764 A1* | 8/2017 | Kim | G02B 27/0103 |
| 2018/0011330 A1* | 1/2018 | Moon | H01S 3/005 |
| 2018/0203249 A1* | 7/2018 | Filhaber | G02B 5/0257 |
| 2019/0079287 A1 | 3/2019 | Kim et al. | |
| 2019/0227336 A1* | 7/2019 | Parrett | G01N 21/8806 |
| 2020/0005718 A1* | 1/2020 | Fattal | G02B 6/0076 |
| 2021/0041291 A1* | 2/2021 | Liu | G01J 3/108 |
| 2022/0146848 A1 | 5/2022 | Filhaber | |
| 2022/0236596 A1 | 7/2022 | Fattal | |

* cited by examiner

ILLUMINATION LINE GENERATION BY DOUBLE-DUTY DIFFUSION

CROSS-REFERENCE TO RELATED APPLICATIONS

This application claims the benefit under 35 U.S.C. § 119(e) of U.S. Patent Application No. 63/421,105, entitled "ILLUMINATION LINE GENERATION BY DOUBLE-DUTY DIFFUSION", filed 31 Oct. 2022, which is incorporated herein by reference in its entirety.

FIELD OF THE DISCLOSURE

Technologies are described for producing illumination lines using a linear diffuser.

BACKGROUND

Light is projected, in a sheet or fan, from a light source (e.g., a laser) to an object where its intersection with the object forms an illumination line. The illumination line is imaged to determine a level of a surface of the object relative to a reference surface, or a profile of the object. A low brightness of the illumination line can lead to inaccurate analysis results, e.g., because of a low signal-to-noise ratio for the illumination line or because of the long exposure times required to image the illumination line. However, high optical intensities for generation of the illumination line can be associated with eye safety hazards.

SUMMARY

According to an aspect of the disclosed technologies, an optical system includes a light source operable to produce input light, a linear diffuser, and a reflector. The light source, linear diffuser, and reflector are arranged and configured to direct the input light from the light source to the linear diffuser, project diffused light from the linear diffuser to the reflector, reflect the diffused light from the reflector to the linear diffuser as reflected light, and modify the reflected light at the linear diffuser to output a planar fan of diffused light, so that an illumination line forms at an intersection of the planar fan and an object.

The foregoing and other implementations according to this disclosure can each optionally include one or more of at least the following features, alone or in combination.

In some implementations, the linear diffuser and the reflector are arranged on respective first and second surfaces of a single body.

In some implementations, the single body includes a solid, optically transmissive material along an optical path between the linear diffuser and the reflector.

In some implementations, the reflector includes a coating on the second surface.

In some implementations, the second surface has a rounded profile.

In some implementations, the first surface has a flat surface, and a substrate of the linear diffuser is adhered to the flat surface, or a diffusing microstructure of the linear diffuser is formed on the flat surface.

In some implementations, the light source includes a multimode laser.

In some implementations, the reflected light is collimated light including a plurality of parallel beamlets, and the linear diffuser is configured to output the planar fan as a plurality of superposed fans corresponding to the plurality of parallel beamlets.

In some implementations, the linear diffuser is positioned at a focus of the reflector.

In some implementations, the optical system includes an optical element arranged and configured to receive the input light from the light source and direct the input light to the linear diffuser.

In some implementations, the optical element includes a reflecting element.

In some implementations, the optical element includes at least one of a prism, an optical fiber, a polarizing beam-splitter, or a diffraction grating.

In some implementations, the linear diffuser includes a reflective element configured to reflect the input light to the reflector as the diffused light.

In some implementations, the reflective element includes a reflective film underlying a diffusing microstructure of the linear diffuser.

In some implementations, a diffusing microstructure of the linear diffuser includes a reflective portion that includes the reflective element.

In some implementations, a gap is defined in the reflector, and the light source is arranged to direct the input light through the gap to the reflective element of the linear diffuser.

In some implementations, the light source includes a plurality of light emitters that are configured to emit light of respective different wavelengths or respective different polarizations.

In some implementations, the linear diffuser is configured to diffuse the input light along a first axis, and the input light has a minimum radius along a second axis that is orthogonal to the first axis.

In some implementations, the light source is configured to produce the input light with a waist that coincides with the object.

In some implementations, the light source is arranged to output the input light in a first direction that is at least 45° different from a second direction corresponding to a central axis of the planar fan of diffused light is output.

In some implementations, the optical system is included in a measurement system. The measurement system includes the optical system; an optical sensor configured to capture an image of the object illuminated by the illumination line; and an image processor configured to analyze the image to determine one or more characteristics of the object.

In some implementations, the one or more characteristics include a topology of the object.

In some implementations, the optical system, the optical sensor, and the image processor are contained in a housing as a portable device.

In some implantations, the measurement system includes an optical component controller, the optical component controller configured to controllably adjust a characteristic of the planar fan of diffused light.

According to another aspect of the disclosed technologies, a system includes an optical sub-system configured to generate a planar fan of diffused light by passing input light through a single linear diffuser twice. The system further includes a control sub-system configured to operate one or more components of the optical sub-system to control use of the planar fan of diffused light.

The foregoing and other implementations according to this disclosure can each optionally include one or more of at least the following features, alone or in combination.

In some implementations, the control sub-system includes an optical sensor configured to capture an image of an illumination line formed by an intersection of the planar fan with an object; and an image processor configured to analyze the image to determine one or more characteristics of the object.

In some implementations, the one or more characteristics include a topology of the object.

In some implementations, the one or more characteristics include a particle concentration in the object or a defect presence in the object.

In some implementations, the optical sub-system includes one or more optical components to adjust a projection direction of the planar fan of diffused light, and the control sub-system is configured to control the one or more optical components to sweep the illumination line across the object.

In some implementations, the control sub-system is configured to direct the planar fan of diffused light for use as an alignment, leveling, or positioning reference.

In some implementations, the control sub-system includes an optical sensor configured to capture light from the planar fan after scattering from interaction with a material; and an image processor configured to analyze the scattered light to determine one or more characteristics of the material.

In some implementations, the control sub-system is configured to adjust one or more of a wavelength of the planar fan of diffused light, a polarization of the planar fan of diffused light, a brightness of the planar fan of diffused light, or a working distance of the planar fan of diffused light.

In some implementations, the control sub-system is configured to direct the planar fan of diffused light for use in a medical application.

In some implementations, the system includes a vehicle in which the optical sub-system is integrated.

In some implementations, the system includes a manufacturing tool or manufacturing equipment in which the optical sub-system is integrated.

In some implementations, the system includes a handheld tool in which the optical sub-system is integrated. Particular aspects of the disclosed technologies can be implemented to realize one or more of the following potential advantages. In some implementations, a number of optical components required to generate the illumination line can be reduced, because a single linear diffuser performs two diffusion operations. In some implementations, optical system reliability can be improved, because multiple components can be self-aligned in a unified optical component. In some implementations, alignment of an optical system can be simplified by reducing a number of degrees of freedom that need be aligned. In some implementations, optical system manufacture can be performed reliably by incorporating a machined solid optical body that serves to self-align system components. In some implementations, a brightness of a generated illumination line can be increased without compromising eye safety, because light is diffused twice to generate a fan of diffused light that can be imaged back to a wide beam with low spatial power density. In some implementations, eye safety can be further improved by orienting light emission so that input light is safely absorbed in the event of component failure, rather than the input light being output from the optical system. In some implementations, a brighter illumination line can be obtained, because bright light sources, such as multimode lasers, can be used compatibly with other components of the optical system and without compromising eye safety. The brighter illumination lines can facilitate use of the described optical systems in contexts that would otherwise be impractical because of insufficient brightness or eye safety concerns. In some implementations, speckle can be reduced, both because of the doubled diffusion provided by the linear diffuser and, in some cases, because a multimode light source can be used.

Details of one or more implementations of the disclosed technologies are set forth in the accompanying drawings and the description below. Other features, aspects, descriptions and potential advantages will become apparent from the description, the drawings and the claims.

Figure 1:
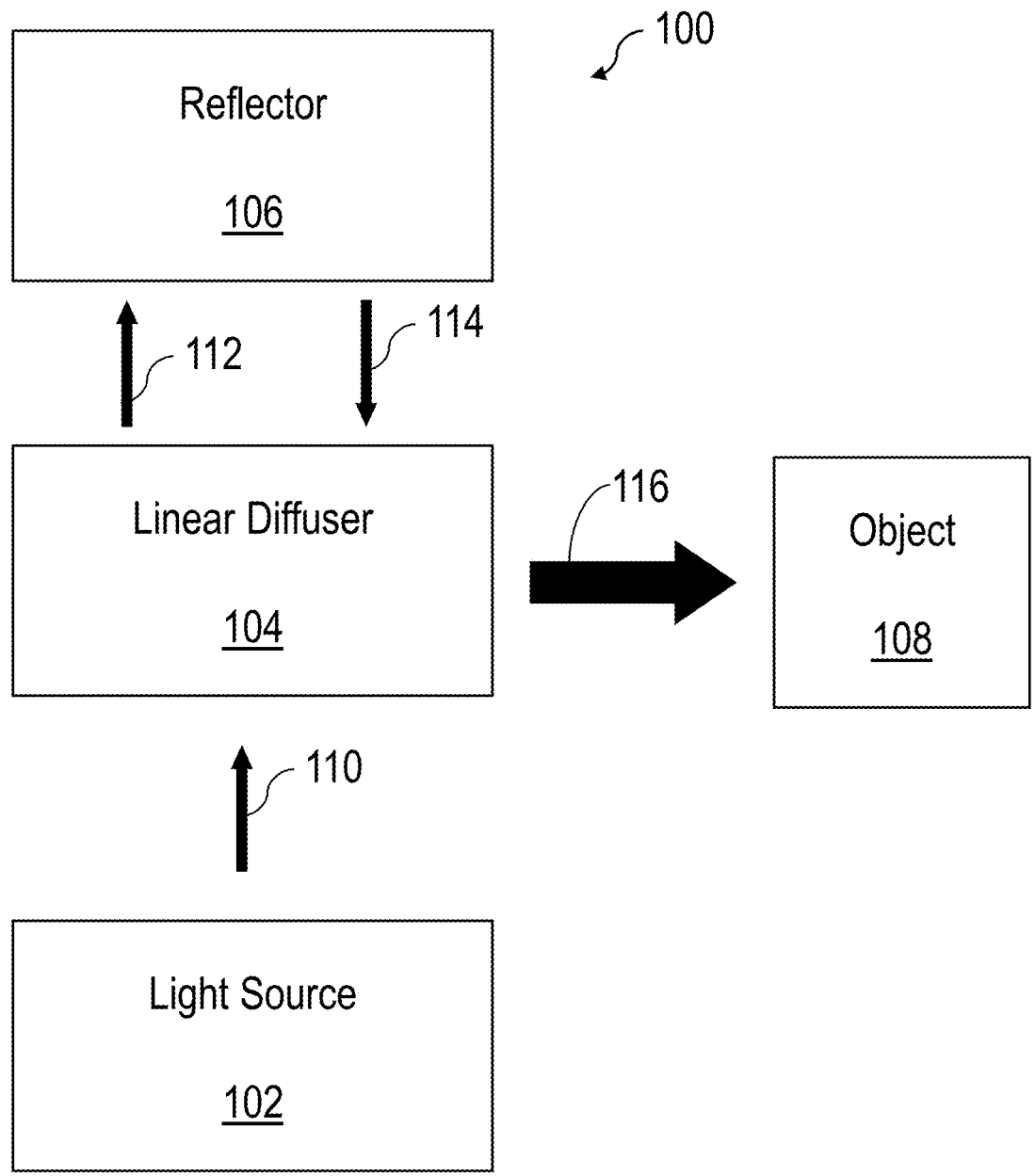
FIG. 1 is a diagram illustrating an example of an optical system that performs double-duty light diffusion.

Certain illustrative aspects of the disclosed technologies are described herein in connection with the following description and the accompanying figures. These aspects are, however, indicative of but a few of the various ways in which the principles of the disclosed technologies may be employed, and the disclosed technologies are intended to include all such aspects and their equivalents. Other advantages and novel features of the disclosed technologies may become apparent from the following detailed description when considered in conjunction with the figures.

DETAILED DESCRIPTION

Technologies described herein use an optical diffuser in a "double-duty" manner to diffuse light twice, generating an illumination line. The diffuser diffuses input light and projects diffused light to a reflector, which redirects the diffused light, e.g., in collimated form, back to the diffuser, such that the diffuser again acts on the diffused light that the diffuser itself projected. Individual beamlets of the reflected light (e.g., parallel beamlets of collimated light) each result in output of a light fan from the diffuser, and the superposition of these light fans forms a planar fan of diffused light. When the planar fan of diffused light intersects with an object, an illumination line is formed on the object. Because the reflected light (e.g., collimated light) functions as a widened light beam with reduced energy density compared to the input light as a result of the doubled diffusion, a human eye receiving the planar fan does not image a small laser emitting point to the retina. Accordingly, a high-power input light source, such as a multimode laser, can be used, resulting in a bright illumination line with an eye-safe fan of diffused light. These bright and eye-safe illumination lines can facilitate use of the described optical systems in a broad range of contexts.

Optical systems according to the present disclosure can be included in systems for surface analysis (e.g., topology and defect analysis), alignment, leveling and positioning, inspection, illumination, and/or other applications. Such systems can include any optical system according to this disclosure, such as optical systems 100, 200, 500, 600, 700, 800, or 900.

In some implementations, the system can include a control system or processor (e.g., control system 1000 of FIG. 10) configured to provide control outputs to the light source (s) and/or optical component(s) to produce the below-described functionalities of optical systems 100, 200, 500, 600, 700, 800, or 900.

In accordance with some implementations, systems including any of optical systems 100, 200, 500, 600, 700, 800, or 900 may be a system configured to perform one or more analyses based on captured images of illumination output by the optical systems. In such implementations, an image processor is configured to obtain and analyze one or more images via optical sensors. The image processor can include one or more computing devices, e.g., including one or more processors and one or more non-transitory computer-readable media storing instructions that, when executed by the one or more processors, cause the one or more processors to perform image analysis operations. The image processor can be included in a single device with other components of the system (e.g., as a portable measurement device), can be a separate device local to the optical system, or can be remote.

Use of the system in a variety of contexts, such as those described below, is facilitated by the high-power eye-safe light generation systems and methods described throughout this disclosure. In many contexts—e.g., when the system is used to generate a reference line in a manufacturing, construction, or medical context—simple user error may cause the illumination to be directed into a user's eye. In the absence of the systems and methods described herein, eye safety may be maintained by generating only low-power illumination. However, in that case, the illumination (such as illumination lines) may be difficult to discern in certain light environments (e.g., in sunlight) and/or when projected onto certain materials (e.g., particularly absorptive or reflective materials). The systems and methods described herein (e.g., incorporating two diffusion processes using the same diffuser) allow high-power illumination to be generated without compromising eye safety. Moreover, even in contexts in which analysis is typically entirely automated (e.g., using optical sensors and an image processor), bright, eye-safe illumination such as that obtained herein may still be preferable, e.g., because system damage may cause projected illumination to escape its enclosure and be emitted towards an eye.

In some implementations, an image processor can be configured to perform object analysis, e.g., analysis of an object based at least on imaging of an illumination line on the object. The analysis can include, for example, triangulation (e.g., laser triangulation) and/or stereometry to map a surface topology and/or solid volume of the object. In some implementations, the optical sensors can include a TOF camera, and the image processor is configured to determine a distance of the object from a component of the system. For example, the image processor can determine distances of the object at multiple points along the illumination line. In some implementations, the optical sensor(s) capture light of a planar fan after scattering from interaction with a material (e.g., a material of the object). In some implementations, the image analysis can be performed in conjunction with scanning (e.g., using a polygon mirror scanning device or another scanning device, which can be included in the optical component(s)) or other manipulation of the illumination line. For example, a controller (such as the controllers described herein) can control one or more optical components to scan the illumination line over different locations on the object, based on which an area topology of the object can be determined, and/or to create area projections. The controller can control one or more optical components to manipulate the line projections/area projections statically or dynamically. Bright, but still eye-safe, illumination can result in more accurate analyses, because the illumination scattering off or reflected from the object can be more accurately identified, even when the proportion of scattered/reflected illumination is small and/or even when an amount of background light is high.

In some implementations, imaging is performed using a short exposure time. For example, in the context of road and rail inspection, the system may be mounted on an underside of a road vehicle or a train, so as to capture images of illumination projected on the road or rail. Because of the rapid movement of the system with respect to the road or rail, rapid exposure times (e.g., on the order of several microseconds) may be necessary. As another example, a pantograph monitoring system including the system can project illumination onto pantographs of passing trains and image the illumination to identify structural failures in the pantographs; short exposure times can be used to obtain clear images. When exposure times are made shorter, the amount of light collected representing the illumination is proportionally smaller. Using the systems and methods described herein, bright illumination can be projected, so that the illumination is readily identifiable in images even when the exposure times are short.

In some implementations, an image processor can be configured to determine one or more non-topological (e.g., compositional) characteristics of the object based on one or more images of the object, including the illumination line. For example, in some implementations, the image processor can identify particles in the object (e.g., when the object is a gas or a liquid), e.g., based on the particles reflecting incident light of the illumination line. In an example of a particle identification process, a transparent gas or liquid is streamed through a chamber. Illumination, such as a planar fan, is projected into the chamber, through the gas or liquid, and to a beam-trap. If the illumination scatters off a particle (e.g., dust or bacteria) in the gas or liquid, a brief flash is detected by the image processor, indicating the presence of the particle. Based on the identification of the particles, the image processor can determine a particle concentration or other measure, e.g., for environmental analysis.

In some implementations, the image processor can be configured to identify photoluminescence from the object illuminated by the illumination line, e.g., for solar cell inspection. For example, the object can include silicon (e.g., a silicon solar cell), and a planar fan can include near-infrared or shortwave infrared light (e.g., light having a wavelength of 800 nm). Defects in the silicon induce photoluminescence from photocarriers excited by the infrared light. Accordingly, the optical sensor(s) can capture images in a defect wavelength band associated with defects in the silicon (e.g., between 1300 and 1600 nm). The image processor can obtain the images and identify a presence and/or location of defects in the silicon by identifying areas of high photoluminescence intensity. In some implementations, based on an analysis of the planar light scattered from a material, the image processor can determine a reflectivity of the material, a particle concentration and/or size distribution in the material (e.g., by a dynamic light scattering process), a composition of the material, or another characteristic of the material.

In some implementations, the image processor is configured to perform gas composition analysis. The object can be gas, and the optical sensor(s) can capture multi-spectral images indicative of absorption by the gas. Based on the absorption characteristics, the composition of the gas can be determined (e.g., by image processor) based on the absorption spectra of different gases. Brighter illumination can be used to obtain a higher signal-to-noise ratio of imaged illumination, without compromising eye safety, based on the optical systems and methods described herein.

Image analysis operations can be implemented using machine vision techniques, such as algorithmic methods (e.g., edge detection, segmentation, and pixel-based feature identification) and/or machine learning methods (e.g., using one or more trained neural networks or other machine learning models). Thus, the system can be a machine vision system that includes the described optical components and at least one imager and/or sensor in the combined system.

The system can be applied in ways that do not require image capture by optical sensor(s) and/or image analysis by the image processor. As such, in some implementations, the system can be a system for outputting light (e.g., illumination lines), without incorporating measurement, image capture, and/or image processing component(s). A controller or processor (e.g., control system 1000), can be used to control the optical systems described herein, such as optical systems 100, 200, 500, 600, 700, 800, and 900.

For example, many workspaces use illumination lines for various alignment and reference purposes, e.g., in place of a ruler or other reference edge. For example, machine tools such as sawblades can emit laser lines to guide placement of workpieces into the tool. In a construction context, structures may require alignment over large distances, e.g., fifty meters, in which case a bright illumination line may be provided to extend that length or longer. In a medical context, patient positioning with respect to a tool (e.g., an MRI machine) can be performed using illumination lines projected as references. Moreover, illumination lines and other illumination types generated by the methods and systems described herein can be used directly for surgical and/or therapeutic purposes, e.g., for laser epilation, tattoo removal, acne/blemish treatment, and/or photodynamic therapy, such as for cancer treatment using emitted light in the 670-690 nm wavelength range. In the medical context, patient safety is especially important; the systems described herein can provide eye-safe illumination with optical powers sufficient for effective medical operation.

In some implementations, the illumination line is used for alignment, leveling, and/or positioning with respect to the object. For example, the system can be included in a level or an alignment tool or other ancillary equipment, included in a manufacturing tool, construction equipment, a vehicle, a medical tool, or other machine, or the system can be a standalone device, e.g., a high power laser line generator. In some implementations, the illumination line can be used for illumination, e.g., in conjunction with a line scan camera for surface inspection, e.g., using monochromatic light. In some implementations, bright and eye-safe structured illumination is projected onto a surface to allow for cross-referencing of images captured by two cameras arranged in a stereoscopic configuration. In an example of such use, structured light generated partially by diffusing light twice with a single diffuser can be projected onto a surface in a manufacturing facility, e.g., a foil surface moving quickly on an assembly line. An image processor can obtain two stereoscopic images of the structured light, match the two images using feature(s) of the structured light, and determine a quality of the foil surface based on the images. A short exposure time can be used to cleanly image the foil, and the brightness of the eye-safe structured light can be sufficient to allow clear capture of the structured light.

In these and other use cases of the system, the characteristics of the optical systems described throughout this disclosure can provide benefits for measurement effectiveness and user safety. Because of the bright, but eye-safe, illumination lines provided by some implementations of the optical systems described herein, images captured by the optical sensor(s) may have a higher signal-to-noise ratio (SNR), improving the speed and/or accuracy of resulting image analysis. For example, analysis can include distinguishing the illumination lines from background illumination and from objects on which the illumination lines are projected; brighter illumination lines may result in more accurate, faster identification of the illumination lines and the shape and/or extent of the objects illuminated with the illumination lines. The brightness may be particularly useful in bright settings, such as construction settings with significant sunlight, in which less-bright illumination may be difficult to discern. And the described systems provide eye-safe illumination even when the illumination is bright and highly-detectable. Moreover, the brightness can allow for shorter exposure times by the optical sensor(s), resulting in decreased motion blur and facilitating imaging of faster moving objects, as described above. Benefits can include operation in brighter environments, improved visibility for users, longer working distances, and longer illumination lines provided by a given light source. The reduction in speckle provided by the optical systems described herein can also contribute to improved accuracy.

Together, the higher brightness and decreased speckle can allow for analysis (e.g., triangulation and/or stereometry) of materials that might otherwise present difficulties for such analysis, such as black rubber, hot metals, structure raw wood, textiles, carbon composites, and materials with a low degree of diffuse reflection (e.g., reflective or translucent materials, such as fish tissue). Illumination projected onto such materials may be difficult to detect if the illumination does not have sufficiently high brightness. This detection difficulty may be exacerbated in environments with high levels of ambient light, such as outdoor, sun-lit environments and bright indoor environments. The double-duty diffusion, light emission directions, and/or other optical system configurations described herein can provide improved user eye-safety while still providing better visibility to humans in these and other bright environments and/or when using materials that are less conducive to illumination, e.g., materials that are highly absorptive or highly reflective of light (electromagnetic radiation) (e.g., so as to absorb a high proportion of projected light or reflect projected light away from imaging devices).

Moreover, in the context of systems that include the optical systems described herein, the improved mechanical reliability of such optical systems (e.g., based on simpler inter-component alignments) can facilitate use in rugged environments, such as for rail, road, and industrial inspections and for military applications.

In view of these and other applications, optical systems described herein, such as optical systems 100, 200, 500, 600, 700, 800, 900, can be included in, among other types of devices/systems: medical measurement tools; surgical and/or therapeutic tools; vehicles (including road vehicles, rail vehicles, flying vehicles including drones, and spacecraft); road and/or rail monitoring systems; infrastructure monitoring systems (e.g., bridge monitoring systems); manufacturing tools; manufacturing test/quality-assurance systems; construction tools, equipment, and/or vehicles; handheld alignment, reference, and/or illumination devices; and military equipment, such as in weapon sights and/or detection systems.

FIGS. 1-9 provide further details of the optical systems 100, 200, 500, 600, 700, 800, 900, in accordance with implementations of the present disclosure.

FIG. 1 shows an example of an optical system 100 in which a linear diffuser 104 interacts with light twice to output a fan of diffused light. The optical system 100 is illustrated schematically; particular physical implementations are described with respect to subsequent figures.

In the optical system 100, a light source 102 emits input light 110. For example, as described in more detail below with respect to FIG. 2, the light source 102 can be a laser (including, in some implementations, a multimode laser), a light emitting diode (LED), or a supercontinuum light source.

The input light 110 is directed from the light source 102 to a linear diffuser 104. This direction of the input light 110 can take various forms in different implementations. In some implementations, e.g., as described with respect to FIGS. 2-6, an optical element, such as a mirror, is arranged and configured to receive the input light 110 and direct the input light 110 to the linear diffuser 104. In some implementations, e.g., as described with respect to FIGS. 7-8, the input light 110 can be emitted directly from the light source 102 to the linear diffuser 104.

Figure 2:
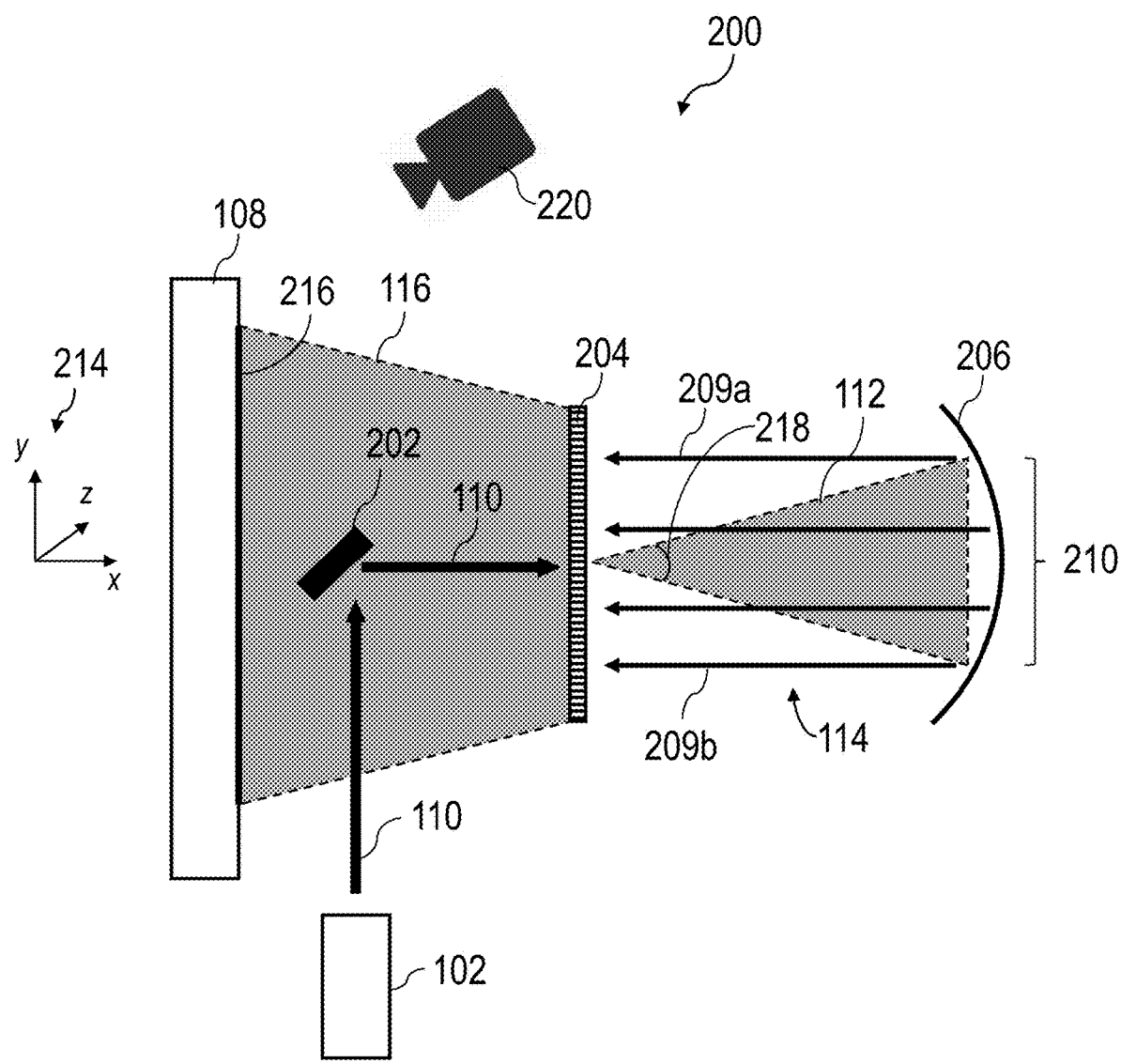
FIG. 2 is a diagram illustrating an example of optical system that includes a discrete linear diffuser and reflector.
Figure 5:
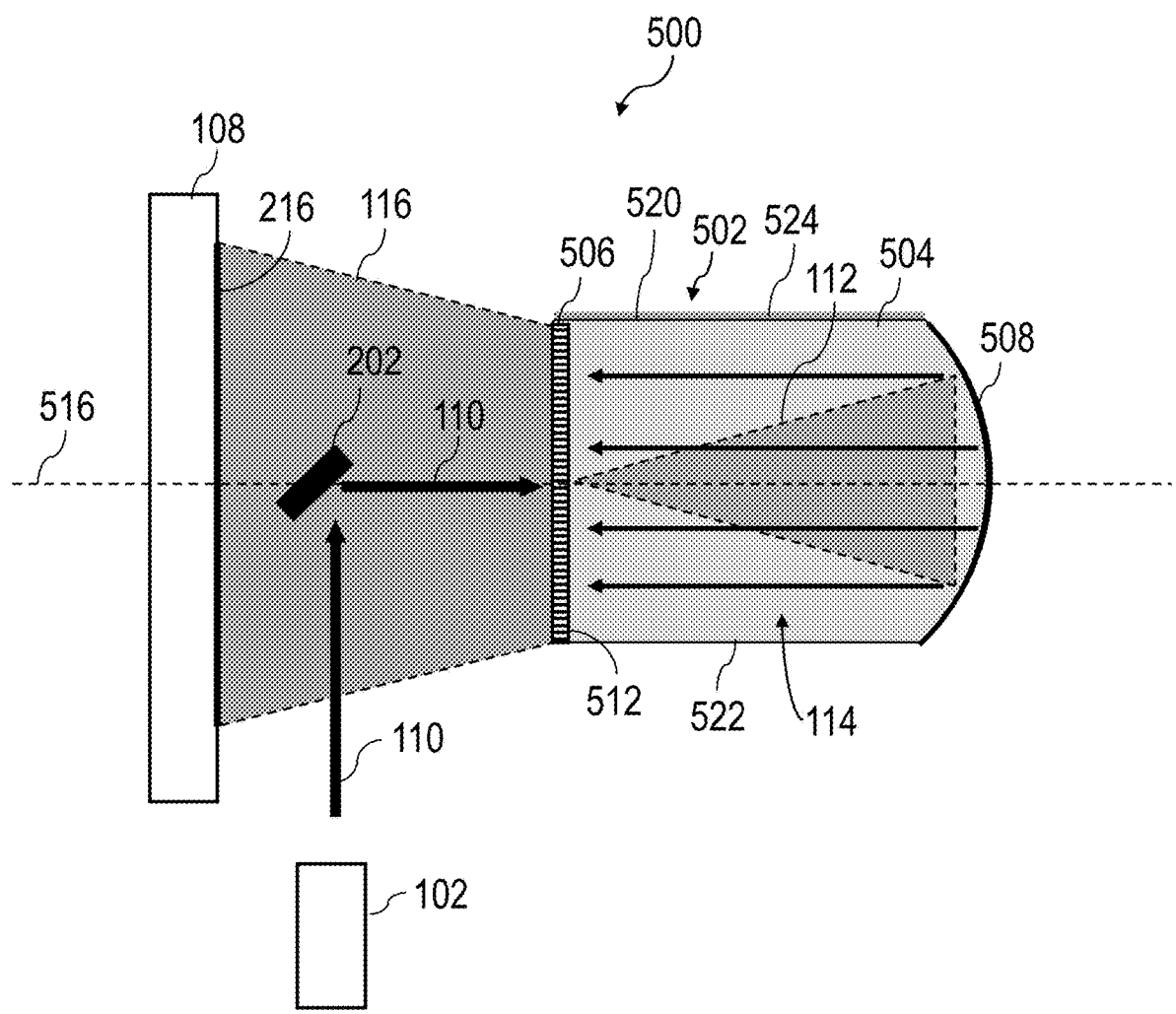
FIG. 5 is a diagram illustrating an example of an optical system including a unified optical component.

The linear diffuser 104 causes diffusion of the input light 110 predominantly along a single axis, maintaining the input light's profile along an orthogonal axis to the single axis. The diffused light 112 is projected to a reflector 106, such as a mirror. The linear diffuser 104 and the reflector 106 can be separate components (e.g., discrete components, as shown in FIG. 2) or the linear diffuser 104 and the reflector 106 can be integrated together on a single body (e.g., as shown in FIG. 5). For example, the linear diffuser 104 and the reflector 106 can be arranged on respective surfaces of a solid optical body.

The reflector 106 reflects the diffused light 112 to the linear diffuser 104 as shaped light 114. The shaped light 114 can be collimated light 114, which can be understood as being composed of parallel beamlets. The shaped light 114 from the reflector 106 can have various types of shapes depending on the shape of the reflector 106 used, as determined by the specific application. Thus, the shaped light 114 can be light diverging off the reflector 106, light converging off the reflector 106, or free formed shaped light. In some implementations, no specific shaping of the reflected light 114 is used. In any case, each of the beamlets of the reflected, shaped and/or collimated light 114 interacts with the linear diffuser 104 to generate a respective fan of light output from the linear diffuser 104. Superposed with one another, the fans form an overall planar fan 116 that is output from the linear diffuser 104 to an object 108. At an intersection of the planar fan 116 and the object 108, an illumination line is formed. The illumination line can be used for alignment, as a reference line, for topological mapping, for material/object analysis, and/or for other purposes, e.g., as described below in reference to system 1030.

FIG. 2 illustrates an example of an optical system 200 including an optical element 202. The optical element 202 is arranged to receive the input light 110 from the light source 102 and direct the input light 110 to a linear diffuser 204. For example, in some implementations, the optical element 202 is a mirror (e.g., a fold mirror), as shown in FIG. 2. The mirror can be configured at a suitable angle with respect to the light source 102 and the linear diffuser 204 so that the input light 110 is directed to the linear diffuser 204 at a predetermined angle, e.g., perpendicular to an axis along which the linear diffuser 204 is configured to diffuse light (in this example, perpendicular to the y-axis).

The light source 102 can be any suitable light source configured to emit light having a narrow profile on at least one axis. This one axis is orthogonal to an axis along which the light will be diffused by the linear diffuser to form a planar fan of light. For example, the light source 102 can be a laser that emits a laser beam having a minimum radius/width in a direction perpendicular to a propagation direction of the laser beam. In the example of FIG. 2, when the input light 110 is a laser beam, the laser beam can be emitted in the y-direction of coordinate axes 214, with a minimum radius/width in the z-direction. When the minimal dimension is a radius, two axes can share the minimum radius, e.g., both the z-direction and the x-direction for the example of FIG. 2. The laser beam is then directed by the optical element 202 to propagate in the x-direction, and subsequent diffusion by the linear diffuser 204 occurs in the y-direction, retaining a narrow beam profile along the z-axis. The retention of this narrow beam profile for light in the optical system 200 provides for the formation of a narrow illumination line.

In some implementations, the light source 102 includes a multimode laser. Compared to single-mode lasers, multimode lasers tend to generate higher output optical power. This higher output optical power can provide brighter illumination lines than those provided by single-mode lasers. The multimode output stems from multimode lasers' larger crystal/emitter size, resulting in a larger beam radius/width than a comparable single-mode laser along at least one axis. However, despite the beam broadening along the one axis, input light 110 from a multimode laser can nevertheless have a narrow beam width along another axis (e.g., an orthogonal axis). Accordingly, for multimode laser beam emission, components of the optical system 200 can be configured so that the linear diffuser 204 diffuses the input light 110 along the axis along which the multimode laser beam of the input light 110 is already broad, retaining the input light's narrow beam profile along an orthogonal axis.

Other light sources besides lasers can be used, in various implementations. In some implementations, the light source 102 is a supercontinuum light source. The supercontinuum light source can include a laser, the output of which is modified to have broad spectral bandwidth. For example, the supercontinuum light source can include an optical fiber exhibiting non-linearity. The optical fiber receives a laser beam and outputs supercontinuum light. The supercontinuum light can retain the spatial coherence of the supercontinuum light's laser beam source (e.g., a narrow beam radius/width in a direction perpendicular to a direction of linear diffusion), so that a narrow illumination line can be formed.

In some implementations, the light source 102 includes an LED, such as a standard LED or a superluminescent diode (SLED). For example, in some implementations, SLEDs that exhibit narrow beam profiles comparable to those of lasers can be used.

In some implementations, the light source 102 includes a light-emitting device and one or more optical elements configured to modify light emitted by the light-emitting device, to produce the input light 110. For example, the light source 102 can include one or more beam-shaping components configured to cause the input light 110 to have a narrow profile on a particular axis (e.g., the z-axis of FIG. 2), such as a collimating lens, a fast axis collimator, and/or a slow axis collimator; one or more spectral filters, to cause the input light 110 to have particular wavelength(s); and/or one or more polarization-modifying components (e.g., waveplates and/or polarization filters), to cause the input light 110 to have particular polarization(s).

The light source 102 can be a solid state, diode-based device or another appropriate unit controllable to emit the input light 110. A wavelength of the input light 110 emitted by the light source 102 can be in the range of 400-2000 nm, such as visible, near-visible ultraviolet, and/or infrared. In some implementations, the light source 102 is controllable (e.g., by a computing device configured as a control system) to output the input light 110 at variable wavelengths. In some implementations, the light source 102 is an on-chip light source. In some implementations, the light source 102 is a discrete light source attached to an optical printed circuit board or other mount for optical coupling to other components of the optical system 200 or another optical system described herein.

In some implementations, the light source 102 includes multiple emitters, such as multiple lasers, multiple supercontinuum light sources, multiple SLEDs, or multiple LEDs. For example, in some implementations, the light source 102 includes multiple light sources (e.g., multiple lasers), with each light source configured to emit light having a different respective wavelength. This configuration causes the input light 110 to be multispectral, which can improve a visibility of the illumination line 216 on materials of different colors. In some implementations, the light source 102 includes multiple light sources (e.g., multiple lasers), with each light source configured to emit light having a different respective polarization. For example, when the input light 110 includes multiple polarizations of light, the input light 110 can be split and/or redirected based on polarization, e.g., as described in reference to FIG. 3C. In some implementations, a controller, such as control system 1000 in FIG. 10, can be configured to control the multiple emitters, e.g., to enable some of the multiple emitters and disable other of the multiple emitters, e.g., to control wavelength(s) and/or polarization(s) of the input light 110 based on which emitters are enabled/disabled at a given time, and/or to control a brightness of the input light 110 based on which emitters are enabled/disabled. Correspondingly, by modification of characteristics of the input light 110, characteristics of the planar fan of diffused light 116 are also modified.

The flexibility of types of optical source usable in optical systems according to this disclosure, such as optical systems 100, 200, 500, 600, 700, 800, and 900, including the potential use of multimode lasers that can provide high optical power for bright illumination lines, in some implementations, is linked to the types of optical elements that can be included in the optical systems. Some systems for generation of illumination lines rely on MEMS components, e.g., MEMS reflectors configured to oscillate to sweep a laser beam. However, some MEMS components' operation is compatible only with narrow input light beams, such as single-mode laser output beams. For example, some MEMS reflectors have dimensions similar to the beam sizes of single-mode laser output beams. The incorporation of these components can preclude not only LED and SLED light sources but also, in some cases, multimode lasers, which can be associated with broader beam sizes than single mode lasers, such that the beams might be larger than MEMS components. By contrast, because some implementations according to the present disclosure include a linear diffuser that acts on light twice, the optical element 202 need not (though can, in some implementations) be a movable MEMS component (e.g., the optical element 202 can be stationary during operation), such that the optical element 202 can have a size compatible with multimode lasers and other light sources. For example, the optical element 202 can be a mirror having dimension (e.g., width or diameter) between 1 mm and 5 mm.

Figure 3A:
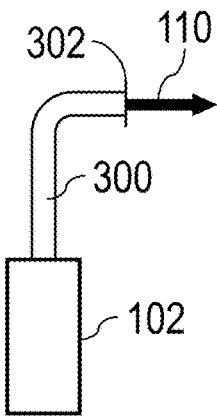
FIGS. 3A-3E are diagrams illustrating examples of optical elements.

FIGS. 3A-3E show implementations of optical elements 202 configured to receive the input light 110 from the light source 102 and direct the input light 110 to a linear diffuser, such as linear diffuser 204, 506, 706, or 806 (referenced hereinafter as linear diffuser 204 in describing FIGS. 3A-3E). In some implementations, the optical element 202 can be configured not only to direct the input light 110 but also to modify the input light 110. As shown in FIG. 3A, in some implementations, the optical element 202 includes an optical fiber 300. For example, the optical fiber 300 can be a single-mode optical fiber or a multimode optical fiber capable of carrying high-power multimode laser light. The optical fiber 300 can be optically coupled to the light source 102 and can be configured (e.g., bent) to direct the input light 110 to the linear diffuser 204 from an output 302 of the optical fiber 300. In some implementations, the output 302 of the optical fiber 300 is optically coupled to the linear diffuser 204, e.g., attached to the linear diffuser 204 so that the input light 110 passes directly from the optical fiber 300 to the linear diffuser 204.

Figure 3B:
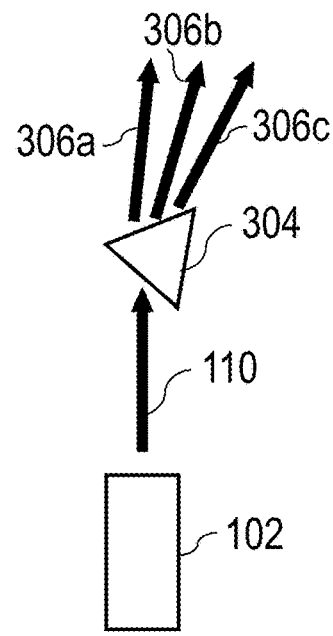

As shown in FIG. 3B, in some implementations, the optical element 202 includes a prism 304. For example, the prism 304 can be a dispersive prism configured to refract the input light 110 in one or more directions based on wavelength(s) of the input light 110. In the example of FIG. 3B, the input light 110 is multi-spectral (includes light of multiple wavelengths), and the prism 304 refracts constituent portions 306a, 306b, 306c of the input light 110 in different directions in a wavelength-dependent manner. For example, light 306a has a first wavelength and is directed by the prism 304 in a first direction, and light 306b has a second wavelength (different from the first wavelength) and is directed in a second direct (different from the first direction). Accordingly, in some implementations, the prism 304 can perform wavelength filtering by directing one or more constituent portions of the input light 110 to the linear diffuser 204 and one or more other constituent portions of the input light away from the linear diffuser 204, e.g., towards an absorber. In some implementations, the prism 304 can be a reflective prism configured to reflect at least some of the input light 110 towards the linear diffuser 204, e.g., as a mirror.

Figure 3C:
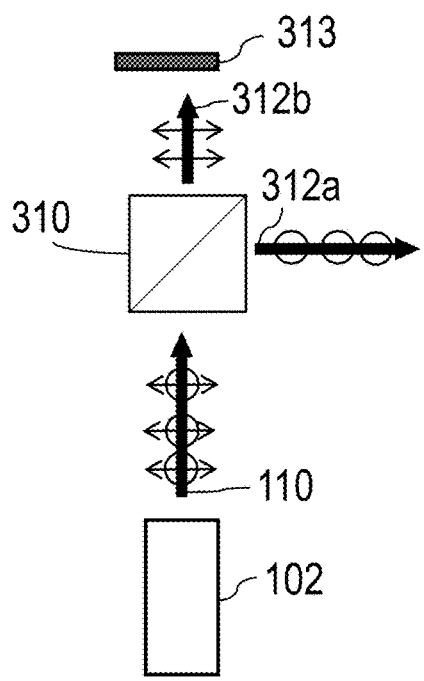

As shown in FIG. 3C, in some implementations, the optical element 202 includes a polarizing beam-splitter 310. The polarizing beam-splitter 310 directs light in different directions depending on a polarization of the light. In the example of FIG. 3C, the input light 110 is unpolarized. The polarizing beam-splitter 310 directs s-polarized light 312a in a first direction (e.g., to the linear diffuser 204 or away from the linear diffuser 204) and directs p-polarized light 312b in a second direction (e.g., away from the linear diffuser 204 or to the linear diffuser 204). Accordingly, in some implementations, the polarizing beam-splitter 310 acts as a polarization filter. In some implementations, an absorber 313 (e.g., a portion of an enclosure of the optical system) is arranged to receive light output from one output direction of the polarizing beam-splitter 310, e.g., to absorb the p-polarized light 312 in the example of FIG. 3C.

Figure 3D:
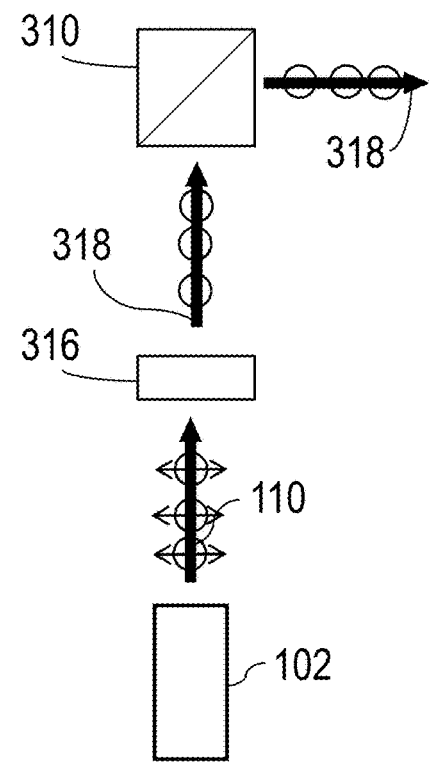

As shown in FIG. 3D, in some implementations, in addition to a polarizing beam-splitter 310, a polarization controller 316 is included to adjust or set a polarization of the input light 110 prior to the input light 110 being received at the polarizing beam-splitter 310. For example, the polarization controller 316 can include a polarization filter, one or more waveplates, and/or a fiber-based polarization controller. In some implementations, the polarization controller 316 is preconfigured and non-adjustable in the optical system. In some implementations, the polarization controller 316 is configurable, e.g., adjustable by a controlling computing device of the optical system to adjust a polarization of light 318 output from the polarization controller. The light 318 is received at the polarizing beam-splitter 310 and directed to the linear diffuser 204. In some implementations, a polarization controller 316 is included without a polarizing beam-splitter, e.g., so that a polarization of the light directed to the linear diffuser 204 can be set and/or adjusted.

Figure 3E:
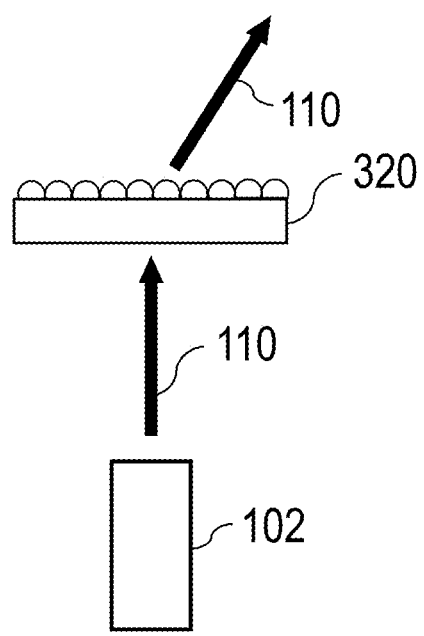

As shown in FIG. 3E, in some implementations, the optical element 202 includes a diffractive optical element (DOE) 320. The DOE 320 can be configured to modify the input light 110 in one or more aspects, e.g., by beam-shaping, beam-splitting, beam direction (e.g., towards the linear diffuser 204), spectral modification/filtering, and/or lensing (e.g., focusing). In some implementations, the DOE 320 includes one or more patterned thin films disposed on a substrate. In some implementations, the DOE 320 includes a grating. For example, the DOE 320 can be a diffraction grating that reflects the input light 110 to the linear diffuser 204.

Figure 4:
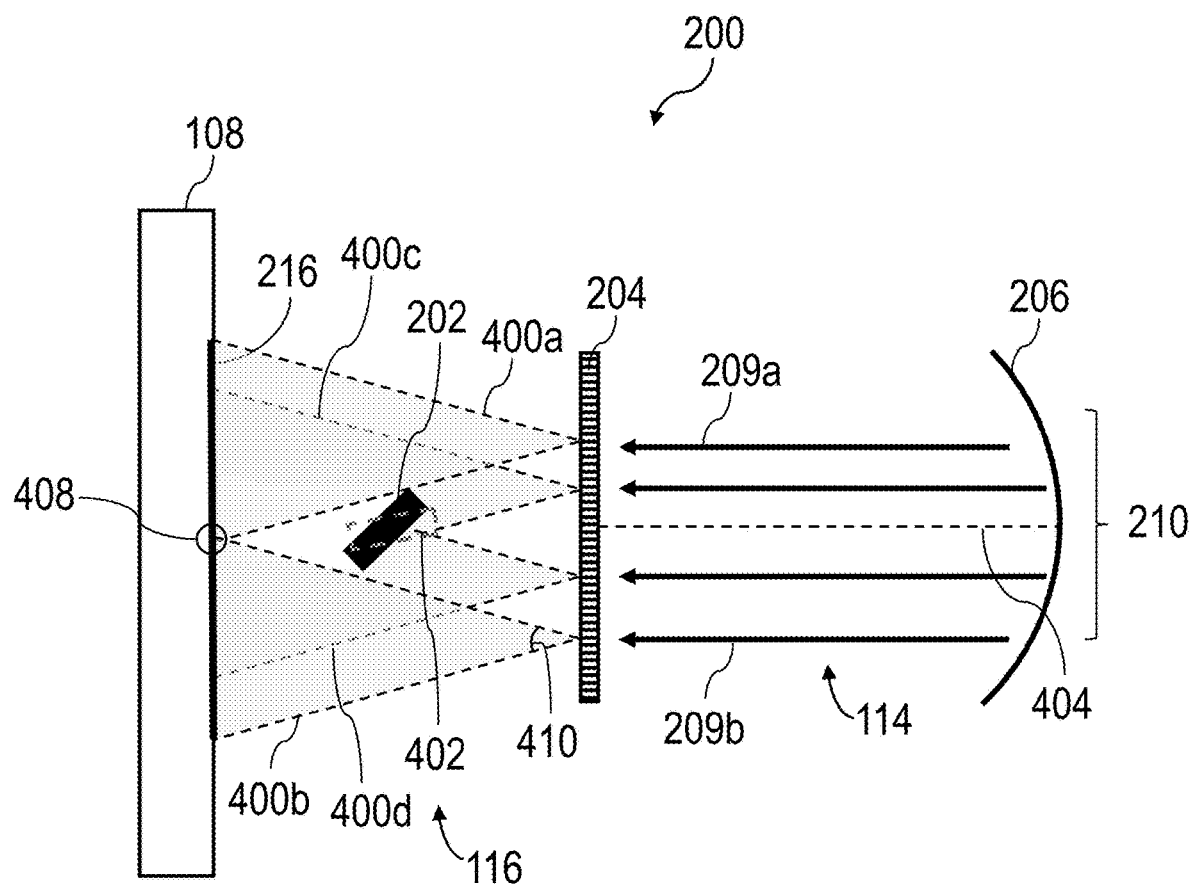
FIG. 4 is a diagram illustrating light fan superposition in the optical system of FIG. 2.

The use of a diffraction grating as the optical element 202 can provide one or more benefits. For example, diffraction gratings can provide an angle of reflection that does not equal the angle of incidence. Accordingly, a diffraction grating can be configured with a higher-angle tilt with respect to the linear diffuser 204, e.g., as shown for optical element 402 in FIG. 4 compared to optical element 202. This configuration can reduce a proportion of the planar fan 116 that is blocked by the optical element, as the planar fan 116 propagates to the object 108. In addition, a diffraction grating can be used to reflect light having multiple wavelengths while maintaining beams having the different wavelengths of light in alignment with one another, e.g., instead of requiring the use of additional optical components to combine the beams. This property of the diffraction grating can be useful for maintaining unidirectional, aligned transmission of the input light 110 when the input light 110 is multi-spectral, e.g., when the light source 102 is broadband or includes multiple light sources (e.g., multiple lasers) that emit different respective wavelengths of light.

Other optical elements can be used instead of, or in addition to, the optical elements described above. For example, in some implementations, a wavelength filter is arranged and configured to filter the input light 110, e.g., a narrowband filter can allow light in only a narrow band of wavelength to be transmitted to the linear diffuser 204. In addition, in some implementations, multiple of the described optical elements can be included. For example, the input light 110 can be provided in an optical fiber that directs the input light 110 to a prism, a mirror, a polarizing beam-splitter, a filter, etc. In some implementations, one or more adjustable light steering elements (e.g., a beam deflector, such as a MEMS beam deflector) can be included to scan the illumination line 216, e.g., along the z-axis illustrated in FIG. 2, the same axis along which the illumination line 216 has its narrowest dimension. In some implementations, the illumination line 216 can be steered along another axis or along multiple axes. In some implementations, one or more optical components are included to form an area projection, e.g., such as an area projection of structured light (e.g., a dot array) based on modification of the planar fan 116. Any of these or other optical components described herein, including component(s) of the optical element 202, can be adjustable, e.g., adjustable by a control system such as control system 1000, described in more detail with respect to FIG. 10. For example, the control system 1000 can be configured to provide signal(s) to the optical components to adjust wavelength-filtering and/or polarization-filtering characteristics (e.g., to adjust a wavelength pass band to provide for emission of different wavelengths of light, and/or to adjust a polarization of light caused by a polarization controller). As another example, the control system 1000 can be configured to control the light source 102 and/or other optical components to adjust collimation characteristics of the input light 110, to cause a beam waist of the light source 102 to coincide with the object 108. As another example, the control system 1000 can be configured to cause an optical component to sweep the illumination line 216 back and forth along the z-axis and/or another axis, e.g., to facilitate a two-dimensional analysis of the object 108 using the swept illumination line 216. Accordingly, characteristics of the planar fan of diffused light 116 can be adjusted to adjust an appearance of the illumination line 216.

Referring back to FIG. 2, the input light 110 is directed to the linear diffuser 204, which diffuses the input light 110 along an axis (e.g., in the example of FIG. 2, the y-axis). As described above, the axis of diffusion can be orthogonal to an axis along which the input light 110 has a narrowest dimension, and the linear diffuser 204 can be configured to cause no or substantially no broadening in that narrowest dimension. Diffused light 112 is projected from the linear diffuser 204 to a reflector 206. The diffused light 112 can be, for example, one or more fan-shaped beams projecting from one or more corresponding points at which the input light 110 is incident on the linear diffuser 204. The fan-shaped beam(s) each have a diffusion angle (in this example, in the x-y plane) determined by characteristics of the linear diffuser 204, e.g., by values of the radius, numerical aperture (NA), and depth of a cylinder array.

In some implementations, the linear diffuser 204 includes an array of optical components, e.g., a cylinder array. For example, the cylinder array can be a linear diffusing random cylinder array (e.g., random in radius, NA, and/or depth) or a pseudo-random engineered cylinder (e.g., random in radius, NA, and/or depth). In some implementations, the linear diffuser 204 includes a holographic optical element. In some implementations, the linear diffuser 204 includes a polymer, e.g., includes diffusing polymer microstructures, such as microstructures formed in an imprinting process. In some implementations, the linear diffuser 204 includes a diffractive optical element, such as one or more films having a microstructure that causes light diffusion. In some implementations, the linear diffuser 204 is configured to perform diffusion for light incident in two opposing directions. For example, linear diffuser 204 can be configured to diffuse the input light 110 and, also, to diffuse shaped (e.g., collimated) light 114 that is received at the linear diffuser 204 from the opposite direction of the input light 110. In some implementations, the two opposing directions of incident light for which the linear diffuser 204 is configured to perform diffusion are at least 90° apart, such as 180° apart.

In some implementations, the linear diffuser 204 is configured to project diffused light in two opposing directions. For example, linear diffuser 204 is configured to project the diffused light 112 and, also, to project/output the planar fan of diffused light 116 in the opposite direction as the diffused light 112. In some implementations, projection of diffused light in two opposing directions is based at least on a reflective portion of the linear diffuser, e.g., as described for linear diffusers in reference to FIGS. 7-8. In some implementations, the two opposing directions of projected diffused light are at least 90° apart, such as 180° apart.

The diffused light 112 can be reflected off the reflector 206 and directed back to the linear diffuser 204 as (substantially) collimated light 114. In some implementations, the linear diffuser 204 is arranged at a focus of the reflector 206, to cause the diffused light 112 projected from the linear diffuser 204 to be collimated. For example, the linear diffuser 204 can be arranged at a distance from the reflector 206 that is half a radius of curvature of the reflector 206. In some implementations, the reflector 206 has a focus coincident with a position on the linear diffuser 204 from which the diffused light 112 is diffused (e.g., coincident with a position at which the input light 110 is incident on the linear diffuser 204). The collimation of the collimated light 114 need not be exact; spatial variation in diffusion by the linear diffuser 204 and/or reflection by the reflector 206 (e.g., due to imperfections in a shape of the reflector 206 and/or due to the diffused light 112 originating at a distributed portion of the linear diffuser 204 instead of at a point source) can cause the collimated light 114 to be at least partially divergent and/or convergent.

The reflector 206 includes a reflecting surface having a shape suitable for providing the shaped light 114, e.g., for providing the collimation of the collimated light 114. For example, the reflector 206 can be a discrete mirror or can include a thin film disposed on a curved surface. In some implementations, the reflector 206 includes a surface having a rounded surface, such as a profile of a conic section, such as a circular profile, an elliptical profile, or a parabolic profile. In some implementations, the surface of the reflector 206 is aspherical, e.g., cylindrical. In some implementations, the surface of the reflector 206 is flat. For example, in some implementations, the reflector 206 is flat, and diffusing microstructures of the linear diffuser 204 are configured to form a uniform illumination line 216 based on light (e.g., at least partially divergent light) reflected from the reflector 206.

The shaped (e.g., collimated) light 114 is received at the linear diffuser 204, which modifies the shaped (e.g., collimated) light 114 to output a planar fan 116 of diffused light. For example, the same structure of the linear diffuser 204 that caused diffusion of the input light 110 (e.g., a cylinder array) can cause diffusion of the shaped (e.g., collimated) light 114 to produce the planar fan 116, and/or the linear diffuser 204 can include a different diffusing structure that produces the planar fan 116. In some implementations, diffusion of the shaped (e.g., collimated) light 114 to produce the planar fan 116 is along the same axis as the input light 110 was diffused on, e.g., the y-axis. For example, the planar fan 116 propagates generally in the −x-direction and is spread along the y-axis while retaining a narrow beam profile along an orthogonal axis (the z-axis), so that a narrow illumination line 216 is formed on the object 108 (e.g., as opposed to a thick bar of light that would be formed if the light were spread substantially along the z-axis). The illumination line 216 is formed at the intersection of the planar fan 116 and the object 108.

In the example of FIG. 2, the linear diffuser 204 and the reflector 206 are discrete optical components. For example, the linear diffuser 204 can be mounted in a first optical mount, and the reflector 206 can be a mirror mounted in a second optical mount. The first and second optical mounts can be attached to an optical printed circuit board or other mount to set an alignment between the linear diffuser 204 and the reflector 206. In some implementations, the linear diffuser and the reflector are portions of a combined optical body, as described with respect to FIG. 4 and succeeding figures.

The collimated light 114 is composed of multiple parallel beamlets, such as beamlets 209a and 209b. The beamlets extend across an effective beam-width 210 of the collimated light 114. FIG. 4 illustrates the optical system 200, with several optical components and light portions omitted for simplicity. As shown in FIG. 4, each beamlet, when interacting with the linear diffuser 204, constitutes a starting point for a respective fan of light. For example, beamlet 209a is diffused by the linear diffuser 204 to produce fan 400a, and beamlet 209b is diffused by the linear diffuser 204 to produce fan 400b. The planar fan 116 is therefore a superposition of many fans corresponding to the many beamlets of the shaped (e.g., collimated) light 114.

The generation of the planar fan 116 as the superposition of fans corresponding to beamlets can enhance eye safety. Because of the many fans generated based on the first and second diffusion operations by the linear diffuser 204, should the planar fan 116 intersect an eye, the planar fan 116 will not be imaged to the retina at a single point. Rather, a widened light beam (having width 210) is imaged to the retina, the widened light beam having reduced spatial energy density compared to the same amount of total optical power imaged to a single point (e.g., a single point of laser beam emission). Accordingly, a reduced optical hazard is presented to the eye and, correspondingly, a high-power light source (such as a multimode laser) can be used to generate a bright illumination line 216 without compromising eye safety.

The width 210 can be a function of the diffusion angle of the linear diffuser 204 and a distance 404 between the linear diffuser 204 and a surface of the reflector 206. The diffusion angle and the distance 404 can be configured so that the width 210 has a value above a critical width associated with a given optical power of the input light 110, such that a spatial power density of the illumination line 216 is less than a critical spatial power density. In some implementations, the spatial power density is further dependent on a radius of curvature of the reflector 206. Accordingly, the diffusion angle, the distance 404, and/or the radius of curvature can be configured so that the spatial power density is less than the critical spatial power density, e.g., a critical spatial power density associated with eye safety. In some implementations, the critical spatial power density corresponds to a critical length of the illumination line 216, and the diffusion angle, the distance 404, and/or the radius of curvature can be configured so that the length is at least the critical length.

In addition, as shown in FIG. 4, only a small portion of the fans are blocked by the optical element 202, so that an unbroken illumination line 216, based on the superposition of the fans, is formed on the object 108. For example, at a point 408 directly behind the optical element 202 (e.g., at a midpoint of the illumination line 216), light from fans 400c and 400d is blocked by the optical element 202. However, light from fans 400a and 400b is not blocked by the optical element 202 and, accordingly, the optical fan 116 is incident on point 408 to produce a portion of the illumination line 216 at point 408. For example, a diffusion angle 410 for diffusion of the shaped (e.g., collimated) light 112 to produce the planar fan 116 can be sufficient to cause the illumination line 216 to be unbroken. In some implementations, the diffusion angle 410 is the same as a diffusion angle 218 (illustrated in FIG. 2) for diffusion of the input light 110 to produce the diffused light 112. For example, the same diffusing element(s) of the linear diffuser 204, such as a cylinder array or other microstructure, can be responsible for both diffusion operations, such that the diffusion angles 218, 410 are the same. In some implementations, the optical element 202 is advantageously smaller than the light source 102. Placing the light source 102 in the optical path of the planar fan 116 and emitting the input light 110 directly at the linear diffuser 204 instead of employing the optical element 202 might, therefore, cause more of the planar fan 116 to be blocked, reducing a uniformity of the illumination line 216.

In some implementations, fabrication and operation of the optical system 200 are enhanced by light in the optical system 200 being diffused twice by the linear diffuser 204. Because of this double operation of the linear diffuser 204, a number of components that would need to be aligned to one another in the system is reduced, compared to the use of two separate linear diffusers to diffuse light twice. In the latter case, the two linear diffusers should be optically aligned with one another; in the optical system 200, by contrast, there is only a single linear diffuser 204 that can be optically aligned with other components of the optical system 200. In addition, in some cases, a cost of the optical system 200 is reduced compared to other systems, because only one linear diffuser need be provided instead of two or more linear diffusers.

In some implementations, when a narrowest dimension of light in the optical system 200 varies along the light's propagation path, the optical system 200 can be configured so that the narrowest dimension has its minimum value substantially at the intersection between the planar fan 116 and the object 108, e.g., at the illumination line 216. For example, in reference to FIG. 1, when the input light 110 is a single-mode or multimode laser beam, the laser beam can have its beam waist minimized at a distance defined in accordance with the sum of the distances between the light source 102 and the linear diffuser 104 (e.g., linear diffuser 204), between the linear diffuser 104 and the reflector 106 (e.g., reflector 206), the reflector 106 and the linear diffuser 104, and the linear diffuser 104 and the object 108. Accordingly, the optical system 200 can be configured (e.g., by suitable arrangement of components of the optical system 200) so that the optical path from the light source 102 to the object 108 (including, e.g., direction by the optical element 202 and reflection by the reflector 206) matches a working distance of the light source 102, so that the beam waist (located the working distance from the light source 102 on the optical path) coincides with the illumination line 216. This feature can decrease the width of the illumination line 216 compared to other configurations. In some implementations, one or more components of the optical system 200 are adjustable to set the working distance to match the optical path from the light source 102 to the object 108. For example, an adjustable collimating component integrated into the light source 102 or following the light source 102 can be configured to adjust the working distance.

In some implementations, optical systems according to the present disclosure can include one or more optical sensors. For example, optical system 200 includes an optical sensor 220, such as a camera. The optical sensor 220 can include one or more types of cameras, such as an area scan camera (e.g., operable to capture two-dimensional images), a line scan camera (e.g., operable to capture one-dimensional images), and/or a time-of-flight (TOF) camera (e.g., operable for range determination). In operation of the optical system 200, the optical sensor 220 can capture one or more images of the object 108, including the illumination line 216 formed on the object 108. The image(s) can then be analyzed (e.g., by a controller such as control system 1000 and/or by another computing system) to obtain a depth profile of the object 108, a distance between the object 108 and the optical system 200, and/or other information. Further description of such operations are provided in reference to FIG. 10. Although illustrated for optical system 200, the optical sensor 220 can be included in any optical system according to this disclosure, such as optical systems 500, 600, 700, 800, and 900.

In some implementations, the linear diffuser and reflector are combined into a single optical component. This configuration can simplify component alignment, improving optical system reliability, and can also provide for simplified fabrication of the optical system. As shown in FIG. 5, an example of an optical system 500 includes a light source 102 and an optical element 202, e.g., as described in reference to FIGS. 1-2 & 4. The optical operation of the optical system 500 can be as described in reference to FIGS. 1-2 & 4. However, in this example, instead of being separate, discrete components, a linear diffuser 506 and a reflector 508 are attached to (and/or integrally formed in) a solid optical body 504, to form a unified optical component 502. The diffused light 112 and the shaped (e.g., collimated) light 114 pass through the solid optical body 504 between the linear diffuser 506 and the reflector 508. The linear diffuser 506 and the reflector 508 can have characteristics as described for the linear diffuser 204 and the reflector 206, respectively, except where indicated otherwise.

For example, the linear diffuser 506 and/or the reflector 508 can be formed separately from the solid optical body 504 and subsequently attached to the solid optical body 504 (e.g., by an adhesive). For example, the solid optical body 504 can be formed with a flat face 512, and the linear diffuser 506 can include a flat substrate or other surface (e.g., a substrate or surface on which cylinders of a cylinder array of the linear diffuser 506 are formed). The flat substrate or other surface can be attached to the flat face 512 of the solid optical body 504. Because this fabrication of the unified optical component 502 relies on attaching two flat components together, the unified optical component 502 is at least partially self-aligning along an optical axis 516 orthogonal to the faces (corresponding to the axis along which the input light 110 incident on the linear diffuser 506 travels, the axis along which the shaped, e.g., collimated, light 114 travels, and a central axis of the planar fan 116). Fabrication/alignment errors for attachment of the linear diffuser 506 to the solid optical body 504, if any, are limited to displacement of the linear diffuser 506 parallel to the shared flat face of the linear diffuser 506 and the solid optical body 504, and small differences in alignment of the linear diffuser 506 and the solid optical body 504 in this direction may have only small or no effects on optical system operation (e.g., on generation of illumination lines).

In some implementations, the linear diffuser 506 and/or the reflector 508 can be formed on the solid optical body 504 itself. For example, the reflector 508 can be a reflecting film/coating (e.g., a metal film) on a curved face of the solid optical body 504, the curved face having a curvature as described in reference to reflector 206. For example, the reflecting film can be deposited onto the solid optical body 504 by printing or by physical vapor deposition (e.g., evaporation or sputtering). The linear diffuser 506 can be formed by modifying a portion of the solid optical body 504 itself (e.g., by etching/patterning the flat face 512 of the solid optical body 504 to have a microstructure that causes linear diffusion of light) and/or by forming one or more layers on the solid optical body 504. For example, in some implementations, a cylinder array, a diffusing DOE, or a holographic diffusing element can be formed with the solid optical body 504 as a substrate.

The solid optical body 504 can be composed of a material that is transparent to the diffused light 112 and shaped light 114. For example, in some implementations, the solid optical body 504 is composed of glass, aluminum oxide (e.g., sapphire or corundum), a transparent ceramic (e.g., neodymium-doped yttrium aluminum garnet (Nd:YAG) or yttrium oxide), a glass-ceramic (e.g., a lithium-aluminosilicate glass-ceramic), tungsten carbide, or another suitable material. In some implementations, the solid optical body 504 has a substantially cylindrical shape.

In some implementations, the integration of the linear diffuser 506, the solid optical body 504, and the reflector 508 into the unified optical component 502 can provide advantages for system manufacture and reliability. The solid optical body 504 can be machined to a precise shape with smooth faces (e.g., using a Computer Numerical Control (CNC) tool), a process that is typically reliable and exact to within microns or tens of microns. The linear diffuser 506 and the reflector 508 then self-align with the solid optical body 504, whether by attachment of separately-formed optical components to the solid optical body 504 and/or by forming the linear diffuser 506 and/or the reflector 508 on the solid optical body 504. Accordingly, the high precision of fabrication of the solid optical body 504 is transferred directly to the linear diffuser 506 and the reflector 508. For example, the solid optical body 504 can be fabricated with a precisely-machined curved surface that, when coated with a reflecting film of the reflector 508, provides a high degree of accuracy for shaping of the reflected light 114, e.g., for collimation of the reflected collimated light 114. As another example, an angular orientation of the flat face 512 can be precisely controlled so that the flat face 512 is in a plane orthogonal to a propagation direction of the collimated light 114.

In addition, because the linear diffuser 506 and the reflector 508 are each self-aligned with the solid optical body 504, the linear diffuser 506 and the reflector 508 are also self-aligned with one another. For example, the solid optical body 504 can be configured (e.g., can have a suitable dimension between the flat face 512 and the curved face on which the reflector 508 is provided) so that the linear diffuser 506 is disposed at a focal distance of the reflector 508, so that the diffused light 112 is well-collimated by the reflector 508. As another example, the solid optical body 504 can be configured so that a central axis of propagation of the diffused light 112 and an axis of propagation of the collimated light 114 are the same, e.g., axis 516. These alignments can be difficult and time-consuming to set manually or separately (in a non-self-aligned manner), e.g., by rotation/translation of components on an optical printed circuit board or other mount. Alignment is further aided by the fact that light is diffused twice by the linear diffuser 506, e.g., instead of being diffused once each by two separate linear diffusers, as described in reference to FIG. 2.

Moreover, once fabricated, elements of the unified optical component 502 can remain in alignment with one another despite mechanical shocks and other environmental effects that might cause misalignment of discrete, separate components. For example, discrete optical elements on an optical printed circuit board or other mount may shift gradually over time or suddenly in response to physical disturbances, such as during use of the optical system. By contrast, the unified optical component 502 is durable against these effects, improving the reliability of the optical system 500 compared to optical systems that lack the unified optical component 502 or a comparable unified optical element.

With the inclusion of the unified optical component 502, in some implementations, the optical system 500 has relatively few degrees of freedom that are adjusted for alignment. For example, when the optical element 202 is a reflecting element such as a mirror or diffraction grating, the angle of reflection of the optical element 202 can be adjusted (e.g., by rotation of the optical element 202) so that the input light 110 is directed at an orthogonal angle of incidence with the linear diffuser 506. However, a position of the optical element 202 along the axis 516 is not critical, e.g., the position can be varied without substantially affecting operation of the optical system 500. And, as noted above, elements of the unified optical component 502 are self-aligned. Accordingly, only a single degree of freedom—the angle of the optical element 202 with respect to the unified optical component 502—need be adjusted for alignment, e.g., during manufacture of the optical system 500. In some implementations, this feature can simplify manufacture and/or cause the optical system 500 to operate more reliably because there are fewer degrees of freedom that can change during operation to cause misalignment.

In the optical system 500, light travels through solid, transparent material of the solid optical body 504 between the linear diffuser 506 and the reflector 508. However, other implementations of unified optical components are also within the scope of this disclosure. For example, in some implementations an optical frame or assembly includes a first surface on which the linear diffuser is arranged and a second surface on which the reflector is arranged. For example, the optical frame or assembly can be a plastic or metal scaffolding that need not include solid, transparent material between the first surface and the second surface. For example, light can be transmitted through air between the first surface and the second surface. The optical frame or assembly can provide self-alignment between the linear diffuser and the reflector as described for the unified optical component 502.

In some implementations, one or more side surfaces of the solid optical body 504, on which the linear diffuser 506 and the reflector 508 are not disposed, are provided with absorptive and/or reflective coatings, such as coating 524. Absorptive coatings can prevent light from leaving the optical system 500 in an undesired direction, e.g., a direction besides the output directions of the planar fan 116, which may present an optical hazard. Reflective coatings can trap light in the optical system 500 that would otherwise leave, and the light can subsequently be reflected off the reflector 508 toward the linear diffuser 506 and thus add to the output light of the planar fan 116. This light-trapping can improve optical efficiency and reduce optical power loss. Absorptive and/or reflective coating(s) can be included in any implementations described herein that include a solid optical body, such as the optical systems 500, 600, 700, 800, and 900.

Figure 6:
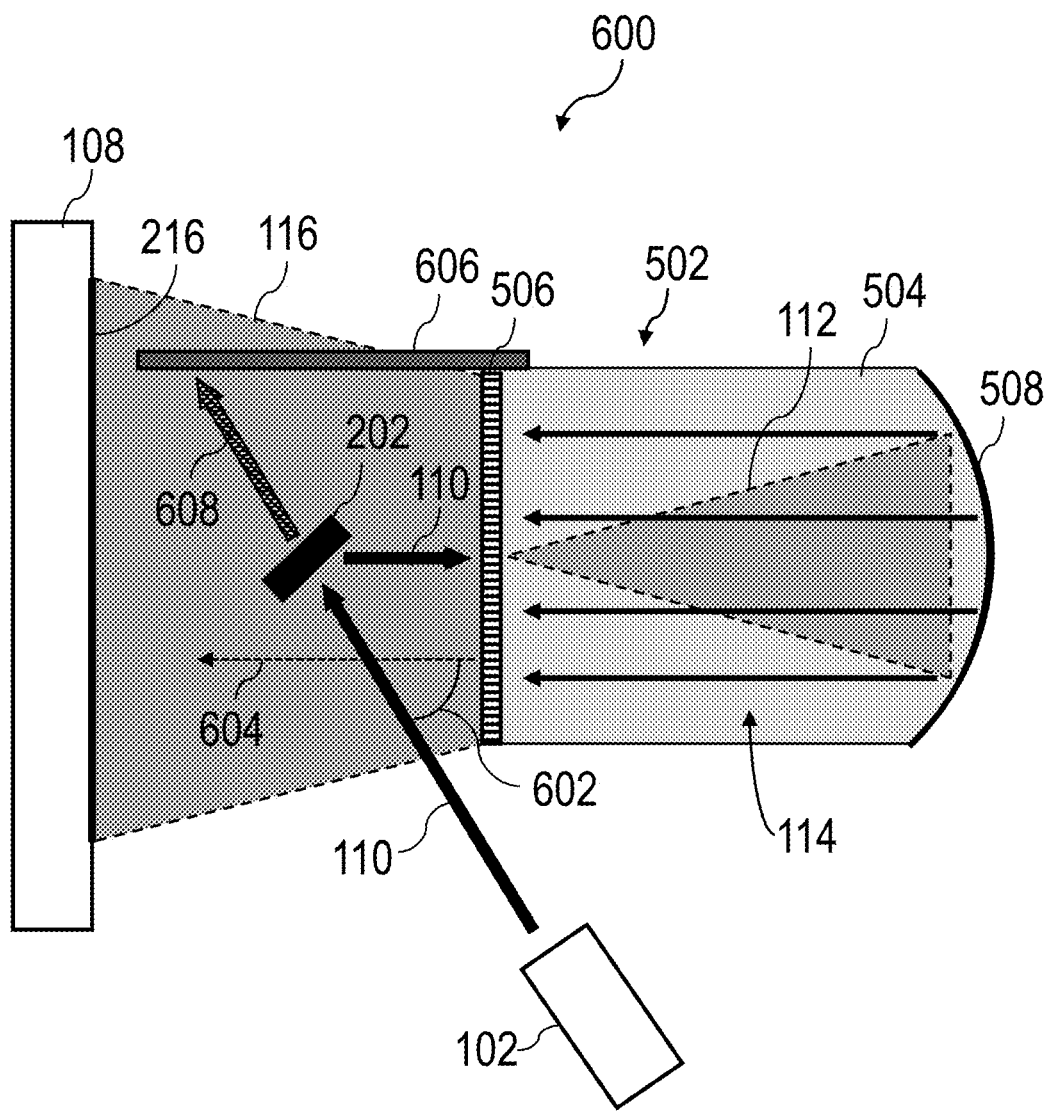
FIG. 6 is a diagram illustrating relative angles of light emission and output in an example of an optical system.

Some aspects of the optical systems described in this disclosure, such as optical systems 200 and 500, can provide improved eye-safety for reasons in addition to the doubled diffusion of light. For example, in some implementations, the input light 110 is emitted from the light source 102 at an angle that prevents output of the input light 110 from the optical system in unmodified form in the event of failure of one or more components of the optical system. As shown in FIG. 6, an example of an optical system 600 includes components as described for the optical system 500. In this example, the light source 102 is arranged to emit the input light 110 at an angle 602 with respect to a direction 604 in which the planar fan 116 is output. For example, the direction 604 can be parallel to a central axis of the planar fan 116.

In standard operation of the optical system 600, the input light 110 is directed by the optical element 202 to the linear diffuser 506. However, in some implementations, in the event that the optical element 202 moves out of the path of the input light 110 (e.g., if the optical element 202 falls out of its mount or the mount shifts), the input light 110 continues traveling along the input light 110's original path as emitted from the light source 102. If that original path is closely aligned with the direction 604 in which the planar fan 116 is output, the input light 110 may travel out of the optical system in un-diffused form with high spatial power density, creating an optical hazard. However, in some implementations, when the angle 602 is sufficiently high, the original path of the input light 110 leads un-directed input light 608 to an absorbing surface 606. For example, the absorbing surface 606 can be an enclosure of the optical system 600 in which other components of the optical system 600 are contained. The absorbing surface 606 absorbs the input light 110, preventing the input light 110 from being output, potentially into an eye, even if the optical element 202 fails to direct the input light 110 to the linear diffuser 204. This fail-safe configuration (which can be applied to the other optical systems described herein, such as optical systems 100, 200, 500, 700, 800, and 900) allows high-power optical sources to be included safely in optical systems according to this disclosure, resulting in bright illumination lines. In some implementations, the angle 602 is at least 45° or at least 60°. For example, in optical system 500, the angle 602 is about 90°.

Figure 7:
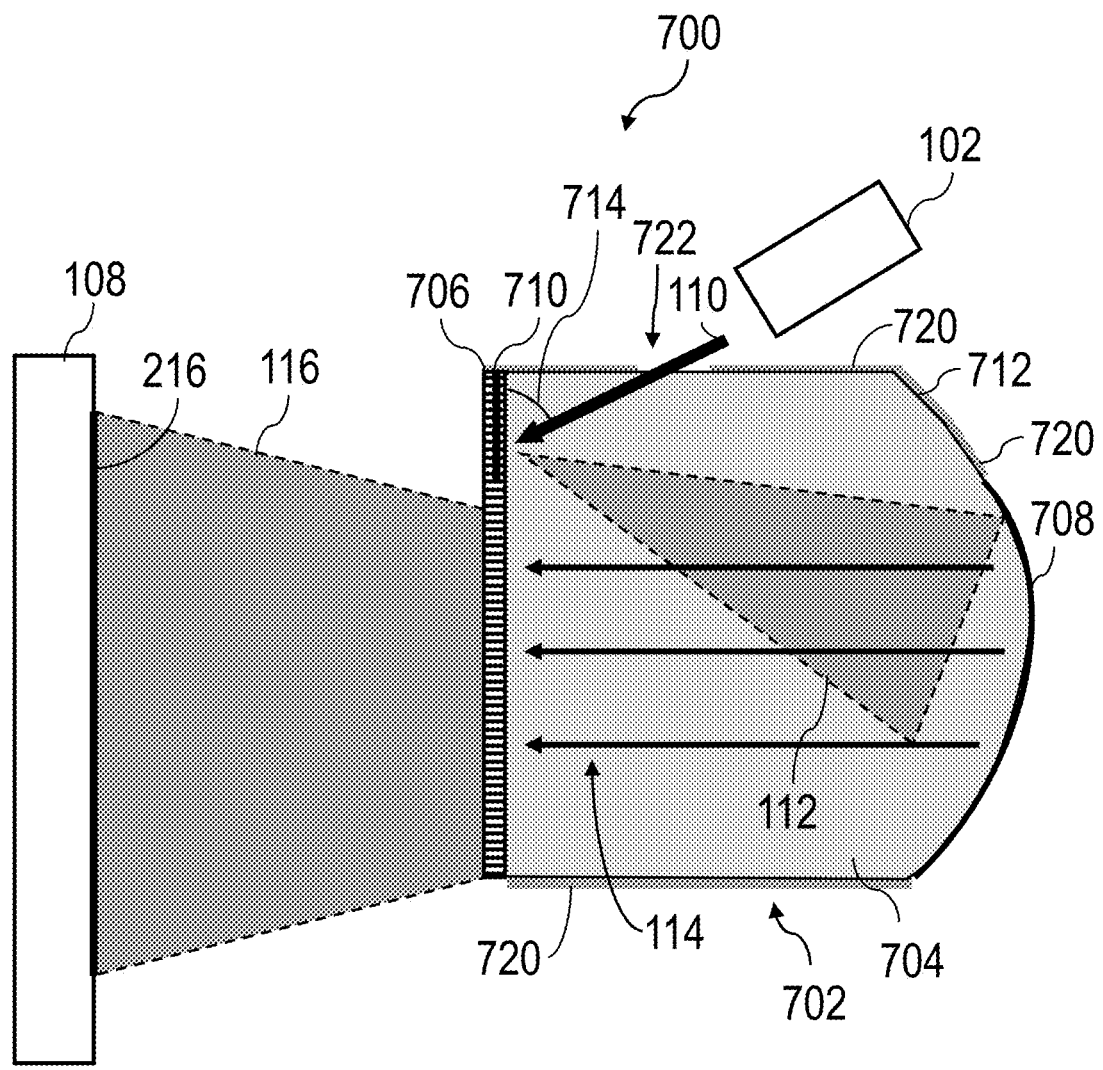
FIG. 7 is a diagram illustrating an example of an optical system in which a linear diffuser includes a reflective element.

In some implementations, the optical element 202 is not included. For example, in some implementations, the input light 110 is directed to a reflective portion of the linear diffuser, such that the linear diffuser both diffuses the input light 110 and directs the diffused light 112 to a reflector. FIG. 7 illustrates an example of an optical system 700, the components of which can have characteristics as described for corresponding components of optical systems 100, 200, 500, and/or 600, except where indicated otherwise. A unified optical component 702 includes a linear diffuser 706, a solid optical body 704, and a reflector 708, e.g., as described for the linear diffuser 506, the solid optical body 504, and the reflector 508, respectively. However, in this example, the linear diffuser 706 includes a reflective element 710 that reflects and diffuses light incident on a portion of the linear diffuser 706 having the reflective element 710. For example, in some implementations, the linear diffuser 706 includes a diffusing microstructure (e.g., a cylinder array, a holographic microstructure, or another diffusing microstructure) disposed on a substrate. The reflective element 710 can be a reflective film/coating (e.g., a metal film) on the substrate, underlying the diffusing microstructure, such that the input light 110 incident on the linear diffuser 706 passes through the diffusing microstructure and is reflected off the reflective film as the diffused light 112. In some implementations, the reflective element 710 is a coating on the diffusing microstructures. In some implementations, at least some of the diffusing microstructures are themselves reflecting and form the reflective element. For example, the microstructures can be metal formed on a metal substrate.

The light source 102 and the linear diffuser 706 can be arranged so that the input light 110 is incident on the linear diffuser 706 at a non-perpendicular angle 714, so that the diffused light 112 is reflected to the reflector 708 through the solid optical body 704 instead of directly back to the light source 102. In some implementations, the non-perpendicular angle 714 is at least 45°, which can cause a majority of the optical power of the incident input light 110 to be reflected as the diffused light 112; however, other angles are also within the scope of this disclosure. In some implementations, the non-perpendicular angle 714 is selected at least partially based on a refractive index of the material of the solid optical body 704, e.g., selected to avoid total internal reflection in the solid optical body 704 based on the refractive index.

In some implementations that include an absorptive or reflective coating 720 on one or more side surfaces of the solid optical body 704, a gap 722 can be included in the coating 720 to provide an entrance for the input light 110 into the solid optical body 704. For example, during deposition of the coating 720, a mask can prevent deposition in an area of the gap 722.

The diffused light 112 is reflected from the reflector 708 and passes through the solid optical body 704 as shaped (e.g., collimated) light 114. In some implementations, the reflector 708 has a shape configured to facilitate collimation of the diffused light 112 based on a position of the reflective element 710 (where the input light 110 is incident on the linear diffuser 706) with respect to the reflector 708. For example, in some implementations, the reflector 708 is an off-axis reflector (e.g., an off-axis parabolic reflector) with a focus coincident with a position on the linear diffuser 706 at which the input light 110 is incident (e.g., coincident with the reflective element 710). In some implementations, the reflector 708 is a flat reflector. In some implementations, the reflector 708 is asymmetric. In some implementations, the reflector 708 has a shape as described for reflectors 206 and 508. A surface 712 of the solid optical body 704 (e.g., a curved surface or a flat surface) can have a shape that defines the shape of the reflector 708, e.g., based on the reflector 708 being a reflective film on at least a portion of the surface 712. For any implementation according to this disclosure that includes a solid optical body having a reflector on a surface of the solid optical body, an absorptive or reflective coating can be included on a portion of the surface that does not include the reflector. For example, coating 720 is provided on a portion of the surface 712 that does not include the reflector 708.

The light 114 is reflected from the reflector 708 and is incident on a portion of the linear diffuser 706 that does not include the reflective element 710, such that the reflected light 114 is modified at the linear diffuser 706 to output a planar fan 116 of diffused light, as described in reference to FIGS. 2 and 4-6.

Figure 8:
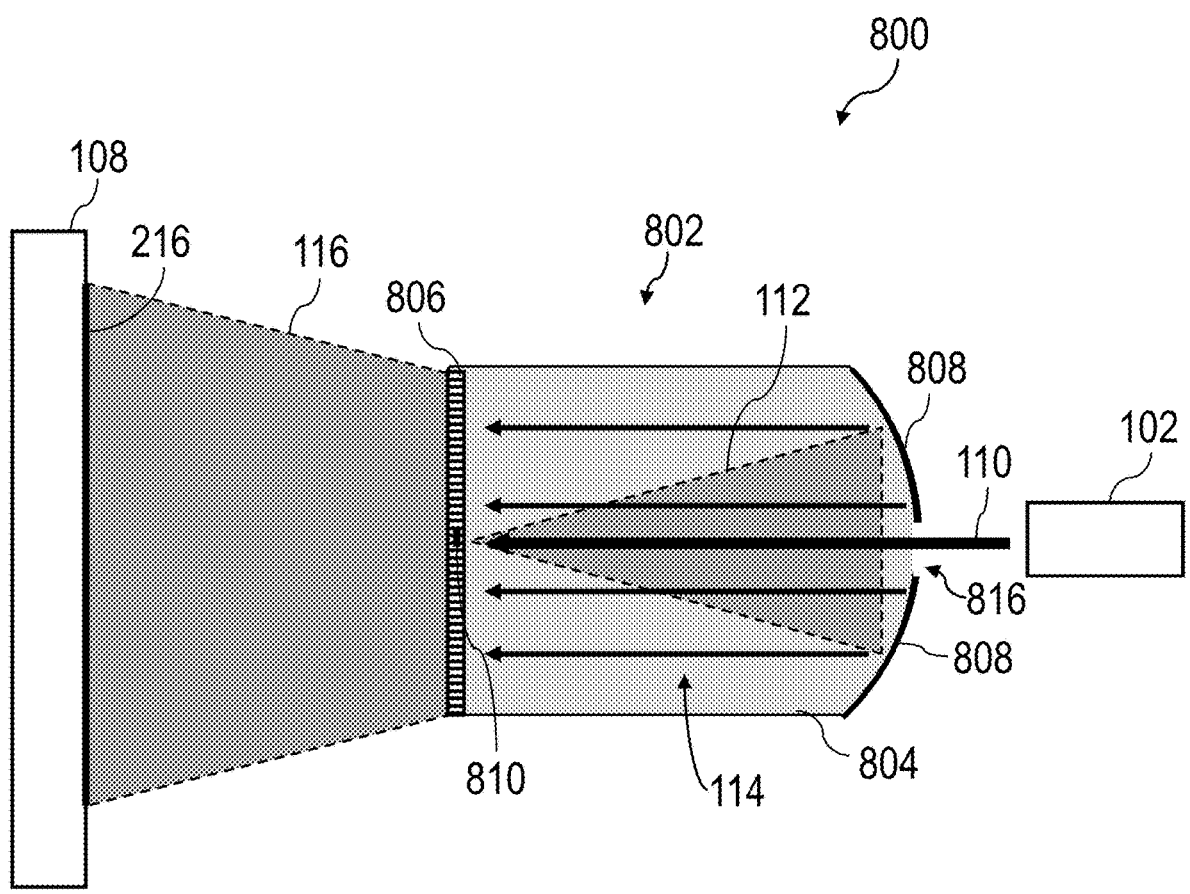
FIG. 8 is a diagram illustrating an example of an optical system in which input light is provided through a gap in a reflector.

FIG. 8 shows another example of an optical system 800 in which the linear diffuser includes a reflective element. The components of the optical system 800 can have characteristics as described for corresponding components of optical systems 100, 200, 500, 600, and/or 700, except where indicated otherwise. In this example, the input light 110 is provided through a gap 816 in the reflector 808. For example, the reflector 808 can be a parabolic reflector, and the gap 816 can be located at a central vertex of the parabolic profile, or the gap 816 can be located at a different portion of the reflector 808. In this example, a unified optical component 802 includes the reflector 808, a solid optical body 804, and a linear diffuser 806. The input light 110 passes through the gap 816 and through the solid optical body 804 and is incident on the linear diffuser 806 at a portion of the linear diffuser 806 having a reflective element 810, e.g., as described for linear diffuser 706 and reflective element 710.

The reflective element 810 and diffusing structures of the linear diffuser 806 (e.g., diffusing microstructures) together reflect and diffuse the input light 110 to cause diffused light 112 to be projected to the reflector 808. The reflector 808 reflects the diffused light 112 as light 114, which is further diffused and transmitted through portions of the linear diffuser 806 that do not include the reflective element 810, to output a planar fan 116 of diffused light. Although diffused light 112 incident on the gap 816 may be lost instead of being diffused, the gap 816 can be made very small compared to a total area of the reflector 808, such that the loss in total optical power is proportionally negligible. For example, the gap 816 can have a dimension (e.g., width or diameter) between 1 mm and 5 mm, e.g., corresponding to a beam width of the input light 110. In addition, although the light 114 incident on the reflective element 810 may be reflected instead of being transmitted as a fan of diffused light, the reflective element 810 can similarly be made very small compared to a total area of the linear diffuser 806, such that the loss in total optical power is proportionally negligible. For example, the reflective element 810 can have a dimension (e.g., width or diameter) between 1 mm and 5 mm, e.g., corresponding to a beam width of the input light 110.

Moreover, beamlets of the light 114 that are incident on the reflective element 810 can be substantially reflected and diffused again as a new portion of diffused light 112, so that optical power is not substantially lost. In some implementations, re-reflection of light back and forth from the reflective element 810 to the reflector 808 multiple times can reduce speckle (discussed in further detail below) by increasing a degree of diffusion of the planar fan 116, because light of the planar fan 116 may have reflected back and forth two, three, or more times, being diffused each time. Accordingly, in some implementations, the reflective element 810 is configured to be relatively large, e.g., to have a dimension (e.g., width or diameter) between 5 mm and 10 mm.

The input light 110 can be provided in un-diffused form, e.g., as a laser beam or as a narrow beam-radius SLED emission, so that a small gap 816 and a small reflective element 810 can fully transmit and reflect the input light 110.

The input light 110 can, though need not, be incident on the linear diffuser 806 at a substantially perpendicular angle. In some implementations, the substantially perpendicular angle can result in an increased proportion of the diffused light 112 being shaped (e.g., collimated) and reflected by the reflector 808, compared to non-perpendicular angles of incidence. In some implementations, the reflector 808 has a focus coincident with a position on the linear diffuser 806 at which the input light 110 is incident (e.g., coincident with the reflective element 810).

Implementations such as those in FIGS. 7-8, in which the input light 110 is directed to a reflective element of the linear diffuser, can provide advantages compared to some other system designs. For example, in implementations that lack an optical element to direct the input light 110, system cost and fabrication complexity can be reduced because of the lack of the optical element. In addition, in some implementations in which the input light 110 is directed to a reflective element of the linear diffuser, the input light 110, which has a high power density, does not pass through the linear diffuser before being diffused and shaped (e.g., collimated). Therefore, the linear diffuser can include a material, such as a polymer, that may otherwise degrade if the input light 110 passes through the linear diffuser.

Although the optical systems 700, 800 are shown as including unified optical component 702, 802, in some implementations, the linear diffuser and reflector of such a system can instead be discrete, separate components, e.g., as described in reference to FIG. 2. In addition, although the optical systems 700, 800 are shown with the input light 110 being emitted directly to the linear diffusers 706, 806, without intervening optical elements that direct or modify the light, in some implementations an intervening optical element on an optical path of the input light 110 can direct the input light 110 to the reflective element 710, 810. For example, the intervening optical element can be a mirror or any other type of optical element described for optical element 202. In general, in various implementations, additional optical components, in addition to those shown in FIGS. 2 and 5-9, can be included along the optical path of the light and configured to direct or modify the light, without departing from the scope of this disclosure. For example, an additional optical element can be included between optical element 202 and the linear diffuser or between the light source 102 and the linear diffuser and can be configured to modify the input light 110 before the input light 110 is incident on the linear diffuser, such as modify spectral characteristics of the input light 110 (e.g., by a wavelength filter), modify polarization characteristics of the input light 110, and/or modify another characteristic of the input light 110.

For example, a polarization beam-splitter, followed by a waveplate (e.g., a quarter waveplate), can be provided between the optical element 202 and the linear diffuser or between the light source 102 and the linear diffuser. The beam-splitter and waveplate together function as a Faraday rotator. For example, the input light 110 can have a polarization, such as P. The input light 110 is reflected towards the linear diffuser by the beam-splitter, which is configured to reflect light of polarization P and transmit light of polarization S. The P-polarized light passes through the waveplate and is diffused by the linear diffuser, reflected, shaped (e.g., collimated), and again diffused by the linear diffuser, as described throughout this disclosure. The waveplate is configured to rotate the polarization of the P-polarized light of the planar fan to S-polarization (e.g., as a quarter waveplate), so that an S-polarized planar fan is transmitted through the beam-splitter and to the object 108. Appropriate configuration of the beam-splitter and waveplate can allow the planar fan to have a selected polarization.

Figure 9:
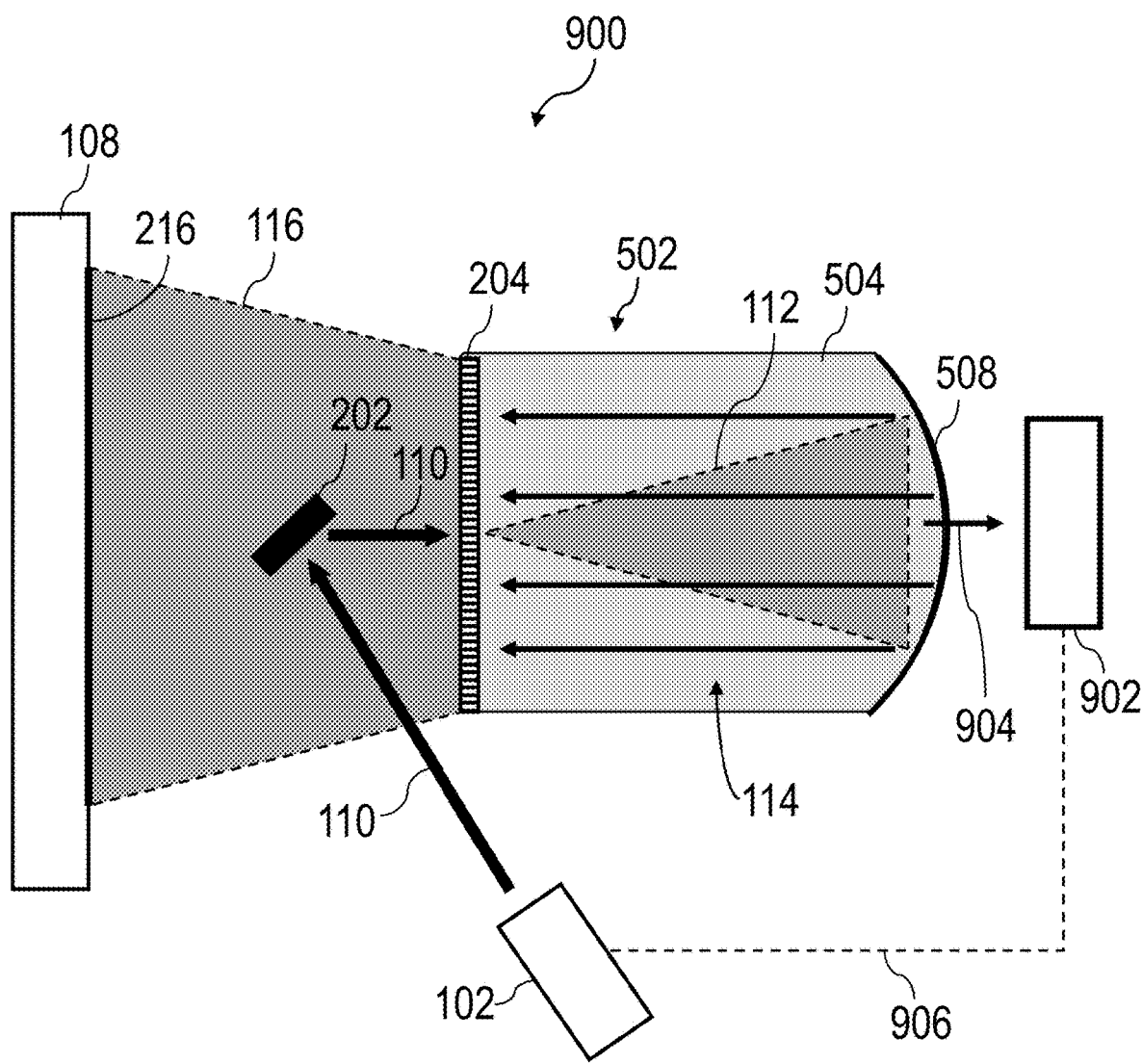
FIG. 9 is a diagram illustrating an example of an optical system that includes an optical sensor.

FIG. 9 shows an example of an optical system 900 that includes an optical sensor for safety. The components of the optical system 900 can have characteristics as described for corresponding components of optical systems 100, 200, 500, 600, and/or 700, except where indicated otherwise. In this example, an optical sensor 902 is arranged behind the reflector 508 and is configured to detect light 904 transmitted through the reflector 508. In some implementations, in typical operation, only a small portion (e.g., several percent or less) of the diffused light 112 is transmitted through the reflector 508. In the event of component failure, however, an increased proportion of the diffused light 112 may be transmitted, e.g., if the reflector 508 is cracked. The optical sensor 902 can be configured to monitor an intensity or power of the light 904 and, in response to detecting that the intensity or power is above a threshold value, cause the light source 102 to switch off, reducing the risk of an optical hazard. For example, the optical sensor 902 can transmit a signal through a coupling 906 between the optical sensor 902 and the light source 102 (e.g., a direct coupling or a coupling through a device controller), the signal causing the light source 102 to switch off. The optical sensor 902 can be included in any implementation according to this disclosure. In some implementations, the optical sensor 902 can be arranged at a different location in the optical system, e.g., along an as-emitted optical path of the input light 110 to detect the input light 110 in the event of failure of the optical element 202.

Besides the enhancements in eye safety and/or illumination line brightness provided by some implementations according to this disclosure, as described above, some implementations according to this disclosure can provide effective speckle reduction. In the context of light diffusion, interference of random phase and amplitude variations of coherent light can result in speckle, e.g., brightness variations in a generated illumination line. Speckle in illumination lines can cause inaccuracies in subsequent analysis such as object surface reconstruction.

First, because the light 114 can be represented as many parallel beamlets, the planar fan 116 is a superposition of many fans corresponding to the beamlets, as described in reference to FIG. 4. The optical path length differences between these fans can be larger than the coherence length of the light source 102, such that many uncorrelated light components are superimposed as the illumination line 216. Accordingly, because light intensities (and not light fields) are superimposed, the superposition (the illumination line 216) exhibits little or no interference to generate speckle. This aspect of speckle reduction is due to the doubled diffusion provided by the linear diffuser, compared to alternative systems that may perform only a single diffusion.

In addition, because implementations according to this disclosure are compatible with multi-mode lasers as the light source 102, the multiple modes in the input light 110 are mixed twice by the linear diffuser, reducing optical interference and, correspondingly, speckle. Optical systems limited to single-mode lasers, by contrast, may not perform mode-mixing and thus may exhibit higher speckle in generated illumination lines. Analogous speckle reduction can be provided by the use of a SLED compared to a single-mode laser. Moreover, in some implementations, multi-mode lasers have shorter coherence lengths than single-mode lasers. Short coherence lengths can result in less speckle, providing a smoother distribution of optical power along the illumination line (fewer fluctuations in intensity along the illumination line) than may be provided by a single-mode laser.

It should be understood that the above-described components of the optical systems such as optical systems 100, 200, 500, 600, 700, 800, and 900 (e.g., light source, optical sensor, optical element, linear diffuser, solid optical body, and/or reflector) can be variously combined into one or more housings/enclosures in a precise and stable interrelationship in a manner that provides a desired form factor and functionality for illumination line generation. Enclosures can be constructed of any appropriate material including polymers, such as polycarbonate, acrylic, etc., or metals, such as aluminum alloy, steel, magnesium alloy, etc. Distances between components and sizes of components can be based on component limitations (e.g., working distances) and on the applications in which the optical systems are to be used. The components can be mounted or otherwise fixed (e.g., using brackets), so as to maintain appropriate spatial relationships with one another. The components can be self-aligned in a unified optical component. In some implementations, at least some of the components are integrated into an optical printed circuit board (PCB) and/or electronic PCB.

Figure 10:
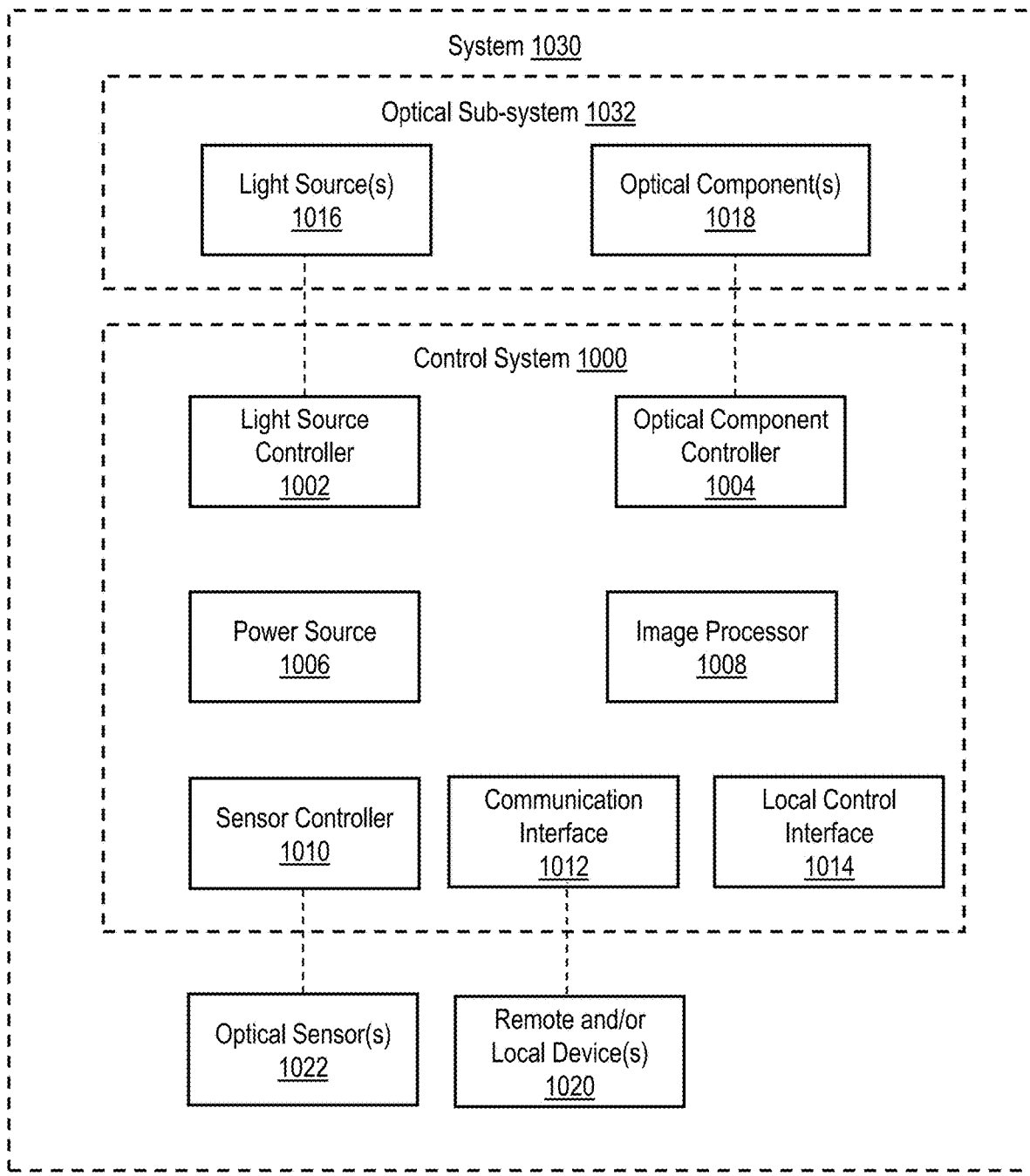
FIG. 10 is a diagram illustrating an example of a system.

Optical systems according to the present disclosure can be included in systems for surface analysis (e.g., topology and defect analysis), alignment, leveling and positioning, inspection, illumination, and/or other applications. FIG. 10 illustrates a system 1030 that includes, as an optical sub-system 1032 of the system 1030, light source(s) 1016 and optical component(s) 1018. The optical sub-system 1032 including light source(s) 1016 and optical component(s) 1018 can include any optical system according to this disclosure, such as optical systems 100, 200, 500, 600, 700, 800, or 900. In some implementations, the system 1030 includes a control system 1000 to control the system 1030, e.g., to provide control outputs to the light source(s) 1016 and/or optical component(s) 1018 to produce the previously-described functionalities of optical systems 100, 200, 500, 600, 700, 800, or 900. The system 1030 can further include optical sensor(s) 1022 (which in some implementations can be included in optical subs-system 1032 or in control system 1000) and/or one or more remote and/or local devices 1020.

In some implementations, components of the system 1030 are contained in a housing, such that the system 1030 can be a portable/handheld device convenient for use in construction environments, manufacturing environments, field environments (e.g., for inspections), and other environments.

As shown in FIG. 10, control system 1000 includes a light source controller 1002, an optical component controller 1004, a power source 1006, an optional image processor 1008, an optional sensor (e.g., camera) controller 1010, an optional communication interface 1012, and an optional local control interface 1014. The controllers 1002, 1004, and 1010, the image processor 1008, the communication interface 1012, and the local control interface 1014 can be implemented as hardware and/or firmware units, software units, or combined hardware, firmware, and software units. For example, these components can include dedicated chips/circuits and/or can include software modules implemented as code stored in one or more storage media of the control system 1000 and running on one or more hardware processors of the control system 1000. Moreover, the elements of the control system 1000 described herein can be combined with one another as aggregate units, and the control system need not include all elements described for the example of the control system 1000.

The power source 1006 can include a battery, such as a rechargeable battery. The power source 1006 provides power to the components of the system 1030, such as the light source(s) 1016, any powered optical components 1018, optical sensor(s) 1022, and components of the control system 1000 itself, such as processing components.

The optical component controller 1004 is configured to controllably adjust one or more elements of the optical component(s) 1018, such as to modify a collimation/working distance characteristic, wavelength characteristic, polarization characteristic, brightness, position (e.g., by adjustment of a MEMS reflector), or other parameter of the planar fan of diffused light. The sensor controller 1010 is configured to control the optical sensor(s) 1022, e.g., to send commands to the optical sensor(s) 1022 to cause the optical sensor(s) 1022 to capture an image. The sensor controller 1010 can receive data representative of the image and provide the data representative of the image to the image processor 1008.

The optional communication interface 1012 is configured to communicate with one or more remote and/or local devices 1020. For example, the communication interface 1012 can receive commands to be implemented by the control system 1000 and/or data to be stored on the control system 1000. The remote and/or local devices 1020 can include, for example, smart phones, personal computers (e.g., laptops), and/or remote systems such as cloud computing systems or other remote servers. The communication interface 1012 can be configured to communicate over USB connectors, Ethernet connectors, or other network connection types, such as wireless connections (e.g., Bluetooth, Wi-Fi, and/or cellular data networks). In general, the communication interface 1012 can communicate over any data communication link(s) implemented via physical cables or wirelessly. In some implementations, the remote and/or local devices 1020 can be configured to perform image analysis operations as described in reference to the image processor 1008. For example, a remote and/or local device 1020 can receive one or more images obtained by the optical sensor(s) 1022 and analyze the images as described below. Accordingly, in some implementations, the remote and/or local devices 1020, configured for image analysis, can be included in the system 1030.

The optional local control interface 1014 is configured to receive user inputs, such as user inputs to control operation of the control system 1000. For example, the local control interface 1014 can include one or more physically-adjustable control elements (e.g., buttons, switches, and/or dials) and/or a touchscreen controllable to display menus with which a user can interact to provide control inputs. In some implementations, the local control interface 1214 includes a display controllable to display information such as a current configuration of the optical sub-system 1032, images captured by the optical sensor(s) 1022, results of image analyses, etc.

In some implementations, the system 1030 is a measurement system configured to perform one or analyses based on captured images of illumination output by the optical sub-system 1032 of the system 1030. In such implementations, the optional image processor 1008 is configured to obtain one or more images captured by the optical sensor(s) 1022 (e.g., receive data representing the one or more images) and analyze the one or more images to obtain one or more analysis results. The image processor 1008 can include one or more computing devices, e.g., including one or more processors and one or more non-transitory computer-readable media storing instructions that, when executed by the one or more processors, cause the one or more processors to perform image analysis operations. The image processor 1008 can be included in a single device with other components of the system 1030 (e.g., as a portable measurement device), can be a separate device local to the optical sub-system 1032 of the system 1030, or can be remote from the optical sub-system 1032 of the system 1030.

Use of the system (e.g., system 1030) in a variety of contexts, such as those described herein, is facilitated by the high-power eye-safe light generation systems and methods described throughout this disclosure.

In some implementations, the image processor 1008 is configured to perform object analysis, e.g., analysis of the object 108 based at least on imaging of the illumination line 216 on the object 108. The analysis can include, for example, triangulation (e.g., laser triangulation when the input light 110 includes laser light) and/or stereometry to map a surface topology and/or solid volume of the object 108. In some implementations, the optical sensor(s) 1022 include a TOF camera, and the image processor 1008 is configured to determine a distance of the object 108 from a component of the system 1030 (e.g., from an aperture from which the planar fan 116 is output). For example, the image processor 1008 can determine distances of the object 108 at multiple points along the illumination line 216. In some implementations, the optical sensor(s) 1022 capture light of the planar fan 116 after scattering from interaction with a material (e.g., a material of the object 108). In some implementations, the image analysis can be performed in conjunction with scanning (e.g., using a polygon mirror scanning device or another scanning device, which can be included in the optical component(s) 1018 and controlled by the optical component controller 1004) or other manipulation of the illumination line 216. For example, the optical component controller 1004 can control one or more optical components 1018 to scan the illumination line 216 over different locations on the object 108, based on which an area topology of the object 108 can be determined, and/or to create area projections. The optical component controller 1004 can control one or more optical components 1018 to manipulate the line projections/area projections statically or dynamically. Bright, but still eye-safe, illumination can result in more accurate analyses, because the illumination scattering off or reflected from the object 108 can be more accurately identified, even when the proportion of scattered/reflected illumination is small and/or even when an amount of background light is high.

The system 1030 can be applied in ways that do not require image capture by the optional optical sensor(s) 1022 and/or image analysis by the optional image processor 1008. As such, in some implementations, the system 1030 is a system for outputting light (e.g., illumination lines), without incorporating measurement, image capture, and/or image processing component(s). The control system 1000, without necessarily including measurement, image capture, and/or image processing component(s), can be used to control the optical systems described herein, such as optical systems 100, 200, 500, 600, 700, 800, and 900.

Figure 11:
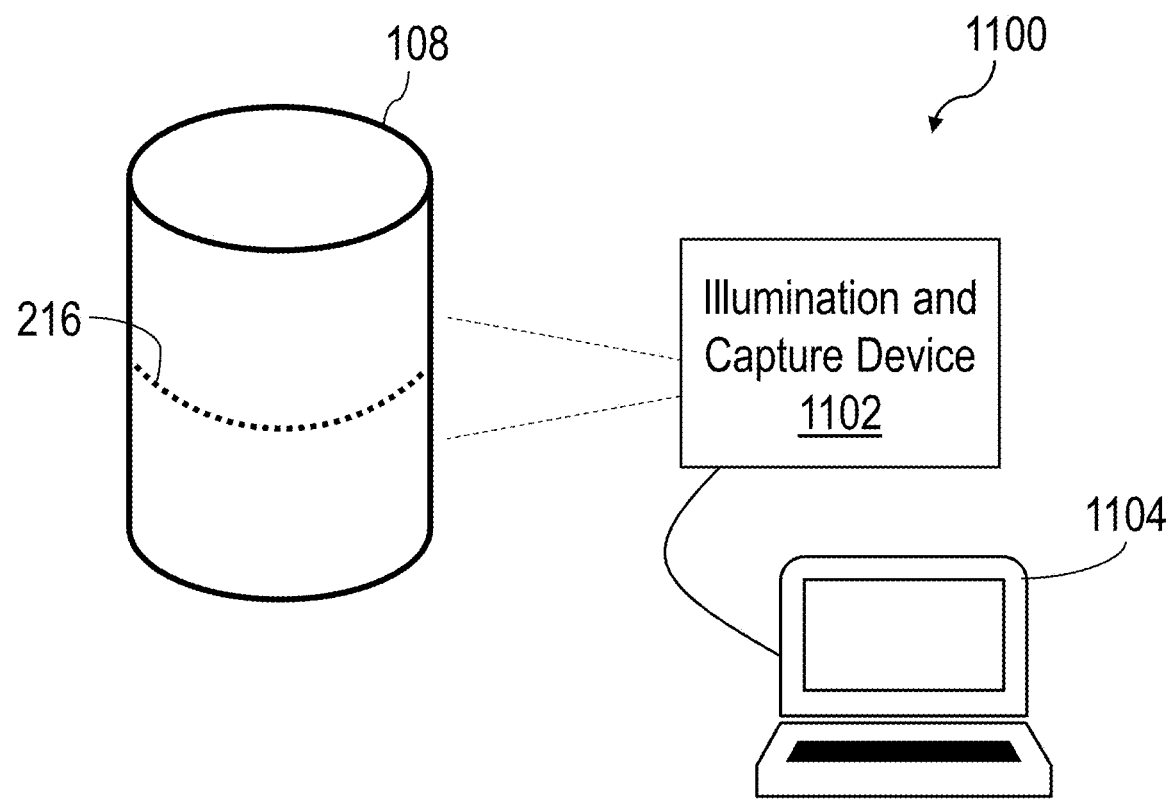
FIG. 11 is a diagram illustrating an example of operation of a measurement system.

FIG. 11 illustrates an example of a measurement system 1100, such as system 1030. The measurement system 1110 includes a portable illumination and capture device 1102 configured to project an illumination line 216 onto an object 108 and capture one or more images of the object 108. The portable illumination and capture device 1102 can include any of the optical systems described herein along with corresponding control elements, e.g., elements of the control system 1000. A computing device 1104, such as a laptop or smartphone, is communicatively coupled to the portable illumination and capture device 1102 and is configured to receive the images and analyze the images, e.g., as described in reference to image processor 1008. In some implementations, the computing device is a computing device integrated into the portable illumination and capture device 1102. In some implementations, the computing device 1104 is configured to perform one or more control operations of the measurement system 1100, e.g., so that a user can control light emission and/or image capture by the portable illumination and capture device 1102 by interacting with the computing device 1104.

A few embodiments have been described in detail above, and various modifications are possible. The disclosed subject matter, including the functional operations described in this specification, can be implemented in electronic circuitry, computer hardware, firmware, or in combinations of them, such as the structural means disclosed in this specification and structural equivalents thereof.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. An optical system comprising:
a light source operable to produce input light;
a linear diffuser; and
a reflector,
wherein the light source, linear diffuser, and reflector are arranged and configured to
direct the input light from the light source to the linear diffuser,
project diffused light from the linear diffuser to the reflector,
reflect the diffused light from the reflector to the linear diffuser as reflected light, and
modify the reflected light at the linear diffuser to output a planar fan of diffused light, so that an illumination line forms at an intersection of the planar fan and an object.

2. The optical system of claim 1, wherein the linear diffuser and the reflector are arranged on respective first and second surfaces of a single body.

3. The optical system of claim 2, wherein the single body comprises a solid, optically transmissive material along an optical path between the linear diffuser and the reflector.

4. The optical system of claim 3, wherein the reflector comprises a coating on the second surface.

5. The optical system of claim 4, wherein the second surface has a rounded profile.

6. The optical system of claim 3, wherein the first surface comprises a flat surface, and
wherein a substrate of the linear diffuser is adhered to the flat surface, or
a diffusing microstructure of the linear diffuser is formed on the flat surface.

7. The optical system of claim 1, wherein the light source comprises a multimode laser.

8. The optical system of claim 7, wherein the reflected light is collimated light comprising a plurality of parallel beamlets, and
wherein the linear diffuser is configured to output the planar fan as a plurality of superposed fans corresponding to the plurality of parallel beamlets.

9. The optical system of claim 1, comprising an optical element arranged and configured to receive the input light from the light source and direct the input light to the linear diffuser, wherein the optical element comprises at least one of a reflecting element, a prism, an optical fiber, a polarizing beam-splitter, or a diffraction grating.

10. The optical system of claim 1, wherein the linear diffuser comprises a reflective element configured to reflect the input light to the reflector as the diffused light.

11. The optical system of claim 10, wherein a diffusing microstructure of the linear diffuser comprises a reflective portion that comprises the reflective element.

12. The optical system of claim 10, wherein a gap is defined in the reflector, and
wherein the light source is arranged to direct the input light through the gap to the reflective element of the linear diffuser.

13. The optical system of claim 1, wherein the light source comprises a plurality of light emitters that are configured to emit light of respective different wavelengths or respective different polarizations.

14. The optical system of claim 1, wherein the linear diffuser is configured to diffuse the input light along a first axis, the input light has a minimum radius along a second axis that is orthogonal to the first axis, and the light source is configured to produce the input light with a waist that coincides with the object.

15. The optical system of claim 14, wherein the light source is arranged to output the input light in a first direction that is at least 45° different from a second direction corresponding to a central axis of the planar fan of diffused light is output.

16. A measurement system, comprising:
the optical system of claim 1;
an optical sensor configured to capture an image of the object illuminated by the illumination line; and
an image processor configured to analyze the image to determine one or more characteristics of the object.

17. The measurement system of claim 16, wherein the optical system, the optical sensor, and the image processor are contained in a housing as a portable device.

18. The measurement system of claim 16, comprising an optical component controller, the optical component controller configured to controllably adjust a characteristic of the planar fan of diffused light.

19. A system comprising:
an optical sub-system configured to generate a planar fan of diffused light by passing input light through a single linear diffuser twice; and
a control sub-system configured to operate one or more components of the optical sub-system to perform at least one of:
control the planar fan of diffused light, or
image analysis based on the planar fan of diffused light.

20. The system of claim 19, wherein the control sub-system comprises:

an optical sensor configured to capture an image of an illumination line formed by an intersection of the planar fan with an object; and an image processor configured to analyze the image to determine one or more characteristics of the object.

21. The system of claim 20, wherein the one or more characteristics comprise a topology of the object and a particle concentration in the object or a defect presence in the object.

22. The system of claim 20, wherein the optical sub-system comprises one or more optical components to adjust a projection direction of the planar fan of diffused light, and wherein the control sub-system is configured to control the one or more optical components to sweep the illumination line across the object.

23. The system of claim 19, wherein the control sub-system is configured to direct the planar fan of diffused light for use as an alignment, leveling, or positioning reference.

24. The system of claim 19, wherein the control sub-system comprises:

an optical sensor configured to capture light from the planar fan after scattering from interaction with a material; and an image processor configured to analyze the scattered light to determine one or more characteristics of the material.

25. The system of claim 19, wherein the control sub-system is configured to adjust one or more of a wavelength of the planar fan of diffused light, a polarization of the planar fan of diffused light, a brightness of the planar fan of diffused light, or a working distance of the planar fan of diffused light.

* * * * *